United States Patent [19]
White et al.

[11] Patent Number: 5,093,801
[45] Date of Patent: Mar. 3, 1992

[54] ARRAYABLE MODULAR FFT PROCESSOR

[75] Inventors: Stanley A. White, San Clemente; Ross M. Orndorff, Fullerton, both of Calif.

[73] Assignee: Rockwell International Corporation, Seal Beach, Calif.

[21] Appl. No.: 549,041

[22] Filed: Jul. 6, 1990

[51] Int. Cl.$^5$ ............................................ G06F 15/332
[52] U.S. Cl. ............................................ 364/726
[58] Field of Search ............................................ 364/726

[56] References Cited

U.S. PATENT DOCUMENTS

| | | | |
|---|---|---|---|
| 4,604,721 | 8/1986 | Gray | 364/726 |
| 4,689,762 | 8/1987 | Thibodeau, Jr. | 364/726 |
| 4,787,055 | 11/1988 | Bergeon et al. | 364/726 |
| 4,899,301 | 2/1990 | Nishitani et al. | 364/726 |

*Primary Examiner*—David H. Malzahn
*Attorney, Agent, or Firm*—H. Fredrick Hamann; George A. Montanye; Gregory D. Ogrod

[57] ABSTRACT

A modular, arrayable, FFT processor for performing a preselected N-point FFT algorithms. The processor uses an input memory to receive and store data from a plurality of signal-input lines, and to store intermediate butterfly results. At least one Direct Fourier Transformation (DFT) element selectively performs R-point direct Fourier transformations on the stored data according to a the FFT algorithm. Arithmetic logic elements connected in series with the DFT stage perform required phase adjustment multiplications and accumulate complex data and multiplication products for transformation summations. Accumulated products and summations are transferred to the input memory for storage as intermediate butterfly results, or to an output memory for transfer to a plurality of output lines. At least one adjusted twiddle-factor storage element provides phase adjusting twiddle-factor coefficients for implementation of the FFT algorithm. The coefficients are preselected according to a desired size for the Fourier transformation and a relative array position of the arrayable FFT processor in an array of processors. The adjusted twiddle-factor coefficients are those required to compute all mixed power-of-two, power-of-three, power-of-four, and power-of-six FFTs up to a predetermined maximum-size FFT point value for the array which is equal to or greater than N.

40 Claims, 12 Drawing Sheets

RADIX 2
TWIDDLE FACTORS: $W_2^0, W_2^1$

RADIX 4
TWIDDLE FACTORS: $W_4^0, W_4^1, W_4^2, W_4^3$

RADIX 3
TWIDDLE FACTORS: $W_3^0, W_3^1, W_3^2$

RADIX 6
TWIDDLE FACTORS: $W_6^0, W_6^1, W_6^2, W_6^3, W_6^4, W_6^5$

ARRAYABLE MODULAR FFT PROCESSOR

BACKGROUND OF THE INVENTION

The invention herein described was made in the course of and/or under Contract No. N00014-85-C-2111 with the Department of the Navy.

FIELD OF THE INVENTION

The present invention relates to signal processing and more particularly to fast-Fourier transformations of the mixed-radix N-point-transform type. The invention further relates to an arrayable, modular, signal processor for accommodating a variety of radix transformations at very high speed and data throughput, over very short epoch times, with minimum system energy expenditure per transform point.

RELATED TECHNICAL ART

There are many advanced signal-processing applications requiring analysis of large quantities of sensor data in short time periods, especially where there is interest in providing "real time" results. Such applications include signal analysis for target, object, or geographical body recognition; compensating for transfer aberrations in communication signals; and optical data processing. In order to be useful in these and other applications, Direct Fourier Transform (DFT) or Fast Fourier Transform (FFT) signal processors must accommodate large numbers of transforms, or amounts of data, using very short epoch times for processing.

Exemplary requirements or features for advanced signal analysis applications are: high-speed FSK demodulation typically requiring processing of 64–128 data points in 50 $\mu$s epoch times; FDM/TDM translation for communication or data processing requiring about 2000 points in 100 $\mu$s; and satellite based processor functions ranging from 1000 points in 1.2 $\mu$s up to 4000 points in 100 $\mu$s. Real-Time image processing typically requires on the order of 1000 data points to be processed in epoch time periods of about 8 $\mu$s.

In addition to the speed and data-throughput requirements, power consumption is a major concern for many applications. In some signal-processing applications, power is supplied by portable generation or storage equipment, such as in space borne processing, where the ultimate power available is limited by many considerations. In such applications, processor power consumption must be as low as possible. One useful measure of utility or merit for FFT processors is the energy dissipation per transform point.

Unfortunately, a key problem with any FFT processor is the amount of power consumed per transform. Generally high-performance, efficient FFT processors exhibit energy dissipations per transform in the range of 100 to 1000 times $log_2 N$ nanojoules, where N is the number of points in a given transform. As a consequence, reasonably large transforms required to process large amounts or arrays of data, result in a large amount of power consumption.

The amount of power consumed by a given processor is directly dependent upon such factors as the amount of memory utilized for data storage and transfer, the amount of control circuitry, and the number of data transfer steps employed. Each processing step or control function executed and every element of remote memory being cycled consumes energy. Therefore, minimizing processing steps or device structure decreases energy consumption. However, computing complex transformations or manipulating large amounts of data using current techniques requires large-scale memory and complex circuit timing and control. While some current designs are fast, they dissipate excessive amounts of power which is particularly unsuitable to space-borne spectrum-analysis applications.

Some VHSIC type FFT devices exist which support 64-point radix-2 transformations with 23 microsecond epoch times, and data transfer rates of 2.8 megasamples per second. However, they require external memory for storing partial products and coefficients, and the maximum transform point-size is often limited to 32 to 512 points. To support very-high-speed memory for higher data transfer rates with independent memory requires about 27 integrated circuit components which consume an aggregate of about 27 watts. This results in an epoch time-total power figure of merit (ETTP) of about 621. Other exemplary processors performing 64-point transforms utilize a radix-4 algorithm at 25 MHz with 15 microsecond epoch times for data rates of about 4.0 megasamples per second. Unfortunately, the radix-4-only structure limits processing to 64-, 256-, 1024-, and 4096-point transformation lengths. Off-processor memory in the form of about 34 integrated circuits is also required, which in turn consumes about 34 watts. The ETTP for this structure is about 510. There are proposed devices utilizing specialized support circuits which reduce the power consumption to about 80 watts with a 1.9 $\mu$m epoch time at 33 megasamples per second, which provides an ETTP of about 152. While this represents an improvement, further improvement is required to accommodate data intensive operations and desired power requirements.

What is needed is a method of maximizing computational performance while minimizing power consumption. It is also desirable to implement FFT processing functions in a small architecture which utilizes well understood manufacturing technology, such as 2 $\mu$m or less CMOS or GaAs structures. A flexible structure capable of dynamically addressing a variety of transformation sizes would also be extremely useful.

SUMMARY

In view of the above problems associated with the art and desired new features, it is one purpose of the present invention to provide an arrayable FFT processor circuit module containing all computational and memory circuitry and having lower power consumption and minimal external control requirements.

It is another purpose of the invention to provide an apparatus capable of pin-programmable implementation for dynamic or static alteration of the point size of the FFT.

An advantage of the invention is the ability to perform very-high-speed operations and handle large amounts of data in very short epoch times.

Another advantage of the invention is the ease of implementation with proven circuit technology such as 1-2 $\mu$m CMOS.

Yet another purpose of the present invention is to provide an FFT processor with minimal complexity and maximum flexibility to accommodate a variety of transformation sizes.

These and other purposes, objects, and advantages are realized in an apparatus and method of performing preselected fast Fourier transformations with a modular, programmable, arrayable, N-point FFT signal-processing apparatus. The processor is connected to a plurality of signal-input lines, typically 64, and a corresponding number of signal-output lines. The processor uses an input memory to receive and store data from the input lines and to store intermediate computations or butterfly results. At least one Direct Fourier Transformation (DFT) element receives data from the input memory and selectively performs R-point direct Fourier transformations, where $R < 8$, on the data according to the preselected FFT algorithm. An Arithmetic Logic Unit (ALU) connected in series with an output of the DFT element receives the DFT results and performs phase adjustment multiplications according to the FFT algorithm and accumulates complex data and multiplication products for additions and subtractions required by the FFT algorithm. The ALU also has an output connected to the input memory for storage of intermediate Butterfly results for the FFT algorithm. At least one output memory is connected to a second output of the ALU for transferring results of the FFT algorithm processing to a plurality of output lines.

At least one adjusted twiddle-factor storage element is connected to a second input of the ALU and provides phase adjusting twiddle-factor coefficients for implementation of the FFT algorithm. These coefficients are preselected according to a desired size for the Fourier transformation being performed and a relative array position of the arrayable FFT processor in an array of z such processors.

In further aspects of the invention, the value of R for the R-point DFT processing is adjustable between 2, 3, 4, or 6 depending upon a preselected FFT point size with 2- or 4-point and 3- or 6-point combinations being preferred. The adjusted twiddle-factor storage element comprises at least one each of a basic twiddle-factor memory and an incremental twiddle-factor coefficient memory. The basic twiddle-factor coefficient memory contains coefficient values required to compute mixed n power-of-two, m power-of-three, p power-of-four, and q power-of-six FFT's, where $N = 2^n 3^m 4^p 6^q$. Preferably, N has a predetermined maximum value less than or equal to 64 for fast efficient operation. The incremental twiddle-factor coefficient memory contains coefficients required to incrementally adjust the basic coefficients, through multiplication, to generate coefficients necessary to compute all mixed power-of-two, power-of-three, power-of-four, and power-of-six FFTs up to a predetermined maximum-size FFT point value T which is greater than N. T is the product of all $N_z$ where N is the preselected FFT point size for each of z such processors in an array of processors. Typically T has a maximum value of around 4096.

Either a multiplier or the ALU is connected to outputs for the basic and incremental twiddle-factor memories to receive coefficients from both memories and to generate products thereof. A synergistic twiddle-factor storage memory is connected to the multiplier or ALU and receives and stores the resulting adjusted twiddle-factor products as synergistic twiddle-factors.

In other embodiments of the invention, the basic-twiddle-factor coefficient memory contains coefficient values required to compute mixed n power-of-two and m power-of-three FFT's, where $N = 2^n 3^m$ and has a predetermined maximum value less than or equal to 64. The incremental-twiddle-factor coefficient memory contains coefficients required to incrementally adjust the basic coefficients to generate coefficients necessary to compute all mixed power-of-two and power-of-three FFTs up to a predetermined maximum-size FFT point value T, greater than N. The maximum value of N is determined by a maximum input and output memory storage capacity of the processor but is generally 64.

The arithmetic logic unit generally comprises a multiplier connected in series with an output of the DFT element and a complex accumulator connected in series with the multiplier. A preferred multiplier is a 16-bit by 16-bit 2's complement, fully parallel modified Booth multiplier with true rounding. The complex accumulator accumulates complex data and multiplication products and forms the necessary positive and negative summations required for the FFT algorithm. A selection element, such as an electronic switch, is disposed in series between the outputs of the DFT element and twiddle-factor storage memories, and the input of the multiplier. The selection element couples one of these outputs at a time to the multiplier. Therefore, the multiplier is time shared for several operations.

A control unit is used to provide clock signals, in timed relationship to each other, for the input memory, Direct Fourier Transformation element, arithmetic logic unit, and the basic twiddle-factor, adjusted twiddle-factor, and output memories so as to synchronize their operations and adjust data input/output rates for the processor to interface with other apparatus. The control unit also provides digital control signals which select desired parameter values such as N, R, and T.

The control signals comprise a series of control bits for setting the DFT element to a selected R-point FFT and control bits for selecting appropriate ones of said adjusted twiddle-factors associated with the value of T. The control unit generally employs parameter storage memory in which a plurality of control bit patterns are stored. The stored patterns are digital codes for setting the values for N, R, and T. At least one of the stored patterns represents control bits which set the DFT element to perform 1 through N/R R-point FFT computations. Another one of the stored bit patterns activates the basic and incremental twiddle-factor selection process and their multiplication at an initialization stage for the processor.

A selection means is connected to the parameter memory that has programmable input pins capable of being electrically interconnected to select desired ones of said control bit patterns. The pins may also select internal clock rates for processor operations.

In a preferred embodiment, the multiplicity of input and output lines comprises 64 signal-input lines and 64 signal output lines and the input memory is a 64-word ping-pong type memory The output memory is a 64-word output buffer memory. The apparatus further comprises an input formatting register connected in series with the signal-input lines for converting input data received in either serial or parallel format into a desired parallel format for processing. An output formatting register is connected in series with the signal-output lines for converting output data from parallel format to either desired serial or parallel formats. The input and output memories are configured to transfer input data and output data in a complex 32-bit 2's-complement format comprising 16 real and 16 imaginary bits. A scaler is connected in series with the ALU and selectively applies block floating point, divide-by-two and divide-by-four scaling.

The method of the invention comprises selectively connecting the multiplier and accumulator to the input buffer/ping-pong memory and the DFT element to perform all integral sub-multiples of mixed power-of-two and power-of-three FFT computations in performing a desired N-point FFT computation. In executing the sub-multiple FFT computations, the multiplier and accumulator are configured to perform mixed radix-2, radix-3, radix-4, and radix-6 computations.

Input data may be generated in a conventional orthogonal format or in a nonorthogonal $(1, W_3)$ format. Similarly, output data may be acceptable in a conventional orthogonal format or in a nonorthogonal $(1, W_3)$ format, depending upon the interface specification.

If the signal source uses a conventional orthogonal format, the power-of-two computations are performed in sequence on orthogonal complex-coordinate-system data then internally transformed to the $(1, W_3)$ coordinate system, and the power-of-three and power-of-six computations are performed in sequence on data which is in the $(1, W_3)$ coordinate system. The output from the $(1, W_3)$ coordinate system then may be converted back to the orthogonal coordinate system if an orthogonal output is required.

Alternatively, if the input data is generated by a source which provides an output that uses the $(1, W_3)$ coordinate system, then the power-of-three and power-of-six computations are performed first on the transformed data. The results then may be internally transformed to the orthogonal complex-coordinate system if required and the power-of-two and power-of-four computations are then performed in sequence.

The method of the invention also comprises the steps of transferring data serially between selected ones of the z processors in the array, pipelining the processors used in the transfer into successive tiers, and clocking the transfer at a rate slow enough to occupy the entire epoch time and reduce power required.

BRIEF DESCRIPTION OF THE DRAWINGS

The novel features of the present invention may be better understood from the accompanying description when taken in conjunction with the accompanying drawings in which.

DETAILED DESCRIPTION OF PREFERRED EMBODIMENTS

Figure 1:
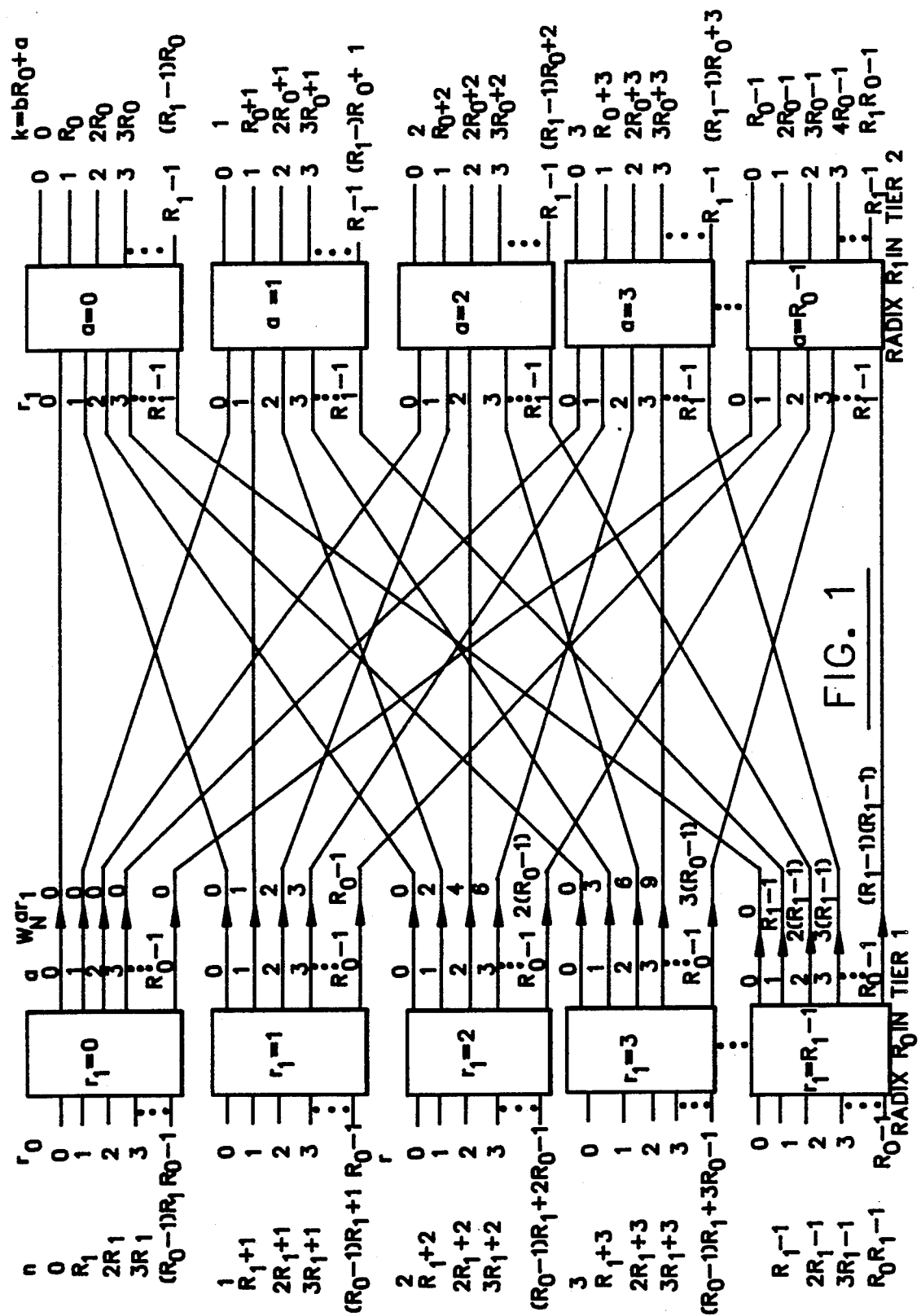
FIG. 1 illustrates an overview of decomposition of an N-point transform DFT into an $R_0$- and $R_1$- point two-tier structure FFT module.

The present invention provides a method and apparatus for performing FFTs of variable point size at very-high throughput over very short epoch times. The invention provides the capability to analyze a large amount of data on the order ob 4096 points, and use epoch times as small as 0.8 microseconds. A preferred embodiment of the apparatus comprises a device capable of handling up to 64 points, programmable in powers-of-two, with a basic operating epoch time of 20 microseconds, and is constructed using mature off-the-shelf manufacturing technology.

As discussed above, major problems with FFT processors are speed and the consumption of power. These problems arise from the energy and time required to move data into and out of remotely located memory structures and the transfer of various control signals to effect processing. These problems are solved in the present invention by using a modular approach which uses a series of one or more modules to compute variable sized transforms. Each module is configured as an optimum FFT processor element with a predetermined amount of memory and associated computational circuitry operating under preselected control instructions to complete internal, block or modular, FFT processing. By creating an overall FFT processor structure from smaller self-contained building blocks, each having its own memory, control, and arithmetic capabilities, power dissipation for the processor system is minimized.

The modular approach also allows very efficient use of memory with minimal energy requirements per each module. The modular design decreases control communications within a given FFT processor system thereby also decreasing associated energy consumption and timing delays for control signal processing. At the same time, throughput is greatly increased because there is no delay within each module associated with transform computations. It has been discovered that the associated modules create an additive efficiency for FFT processing.

In the preferred embodiment, the basic module or building block for an arrayable processor was chosen as a 64 point structure. Tests have shown that larger modules are possible using the teachings of the present invention, but there are yield, speed, and energy tradeoffs associated with device size and complexity which appear to make larger modules less desirable. Therefore, the description of the invention employs computational modules configured to have maximum transform sizes of 64 points. Since each module is programmable, it comprises circuitry for accommodating less than 64 points, in increments of 2 or 3, where desired.

The FFT module of the invention is manufactured with multiplier free butterfly structures in mind to save energy and speed. Such structures include circuitry for performing Radix-2, -3, -4, or -6 transformations. Radix- 2 and -3 circuitry allows N-point FFTs of size $2^n3^m$ points to be preformed. Combinations of $2^n$ and $3^m$ result in transformations of 1–4, 6, 8, 9, 12, 16, 18, 24, 27, 32, 36, 48, 54, and 64 points (where $N=2^n3^m \leq 64$). However, for purposes of clarity a Radix-2, -4 structure is used for illustrating and discussing the invention below. A brief illustration of the relationship to Radix-3 and Radix-6 structures is also provided so that those skilled in the art will readily understand the modifications required to utilize Radix-3, -6 structures.

The implementation of the present invention is accomplished using a decomposition rule that allows the decomposition of complex transformations into smaller point size transformations which are then distributed over smaller radix-sized blocks. The small radix transformations are easily implemented in a specialized dedicated structure operating at very high speeds, and the transformation results combined using modular memory and accumulation circuitry.

It is well established that an N-point Direct Fourier Transformation (DFT) can be decomposed into a set of smaller point size DFTs, X and Y, when the point size N is factorable into smaller non-negative integers (N=XY, where X and Y are non-negative). A decomposition of N into XY results in one transformation rank or tier of X DFTs having Y points each (radix-Y) and one tier of Y DFTs of X points each (radix- X). For each output of the first rank there is a unique input to the second rank which also has a complex multiplication associated with it which implements a phase shift known as a "twiddle factor" (phase-shifting complex-weighting coefficients). The X and Y DFTs can also be further decomposed until their values are prime numbers.

Where there are $x_n$ input time samples of data resulting in $X_k$ output frequency samples from the DFT and the twiddle factors employed are stated as $W_N^{nk} = e^{-2jnk/N}$ the DFT is expressed by the relationship:

$$X_k = \sum_{n=0}^{N-1} x_n W_N^{nk} \quad (1)$$

where N is the number of both the input and output samples.

Polynomial substitution (trinomials in this case) on the subscripts n and k can be used to decompose this DFT into smaller radix (point size) DFTs. For example, to decompose a given radix value N into three smaller radix values $R_o$, $R_1$, and $R_2$, (series of smaller $R_o$-, $R_1$-, and $R_2$-point transforms) where $N=R_oR_1R_2$, one can use the expressions:

$$n = r_0R_1R_2 + r_1R_2 + r_2 \quad a, r_0 = 0, 1, 2, \ldots, R_0 - 1$$
$$k = cR_0R_1 + bR_0 + a \quad b, r_1 = 0, 1, 2, \ldots, R_1 - 1$$
$$N = R_0R_1R_2 \quad c, r_2 = 0, 1, 2, \ldots, R_2 - 1$$

and equation 1 becomes:

$$X_{cR_0R_1+bR_0+a} = \sum_{r_0=0}^{R_0-1} \sum_{r_1=0}^{R_1-1} \sum_{r_2=0}^{R_2-1} (W_N^{(cR_0R_1+bR_0+a)(r_0R_1R_2+r_1R_2+r_2)} x_{r_0R_1R_2+r_1R_2+r_2}) \quad (2)$$

This equation can be reduced using substitutions for the various terms such as:

$$W_N^{cR_0R_1r_0R_1R_2} = W_N^{cR_0R_1r_1R_2} = W_N^{bR_0r_0R_1R_2} = 1; \quad W_N^{cR_0R_1r_2} = W_{R_2}^{cr_2};$$

$$W_N^{bR_0r_1R_2} = W_{R_1}^{br_1}; \quad W_N^{ar_0R_1R_2} = W_{R_0}^{ar_0}; \quad W_N^{ar_1R_2} = W_{R_0R_1}^{ar_1}; \quad W_N^{br_2R_0}W_N^{ar_2} = W_N^{(bR_0+a)r_2};$$

to:

$$X_{cR_0R_1+bR_0+a} = \sum_{r_2=0}^{R_2-1}\left[W_{R_2}^{cr_2}W_N^{(bR_0+a)r_2}\sum_{r_1=0}^{R_1-1}W_{R_1}^{br_1}\left(W_{R_1}^{ar_1}\sum_{r_0=0}^{R_0-1}W_{R_0}^{ar_0} x_{r_0R_1R_2+r_1R_2+r_2}\right)\right] \quad (3)$$

This equation can be used to generate a three tier structure of transformations or discrete transformation "blocks" to mechanize the computation of an N-point FFT. The size of the transforms in the first tier is $R_o$, and the size of the transforms in the second and third tiers are $R_1$ and $R_2$, respectively.

Each transformation block in the first tier has inputs $r_O=0$ through $R_O-1$, and outputs $a=0$ through $R_o$. Each first tier discrete transformation block is identified by the terms $r_1$, $r_2$ which vary from 0 to $R_1-1$ and $R_2-1$ respectively. Where there are a series of input data samples $x_o$, $x_1$, . . . $x_n$, $x_{N-1}$, they are assigned to the transformation inputs according to the definition of n given above.

In the second tier, with transform size $R_1$, each transformation block is identified by the terms $r_2$ and a. Here the inputs are $r_1=0$ through $R_1-1$ and the outputs from each transformation are $b=0$ through $R_1-1$. Therefore, each first tier output is designated by $r_1$, $r_2$. the block number, and a, the output for a given block. The corresponding input to the second tier being specified by $r_2$ and a, the block numbers, and $r_1$, the input number. The twiddle factor for the first tier output is given by:

$$W_{R_0R_1}^{ar_1} = e^{-j2\pi ar_1/R_0R_1} \quad (4)$$

The third tier has blocks identified by the terms b and a. The inputs for each block are $r_2=0$ through $R_2-1$ and the outputs are $c=0$ through $R_2-1$. The inputs are $r_2=0$ through $R_2-1$ and the outputs from each block are $c=0$ through $R_2-1$. Each second tier output is designated by $r_2$ and a, the block numbers, and b, the output for a given block. The corresponding input to the third tier being specified by b and a, the block numbers, and $r_2$, the input number. The twiddle factor for the second tier output is given by:

$$W_N^{(bR_o+a)r_2} = e^{-j2\pi(bR_o+a)r_2/N} \quad (5)$$

If c, $r_2$, and $R_2$ are set equal to 0 then the transformation is subdivided into a two-tier structure and equation 3 becomes:

$$X_{bR_0+a} = \sum_{r_1=0}^{R_1-1} W_{R1}^{br1} \left( W_{R0R1}^{ar1} \sum_{r_0=0}^{R_0-1} W_{R0}^{ar0} x_{r_1R_2+r_2} \right) \quad (6)$$

Figure 2:
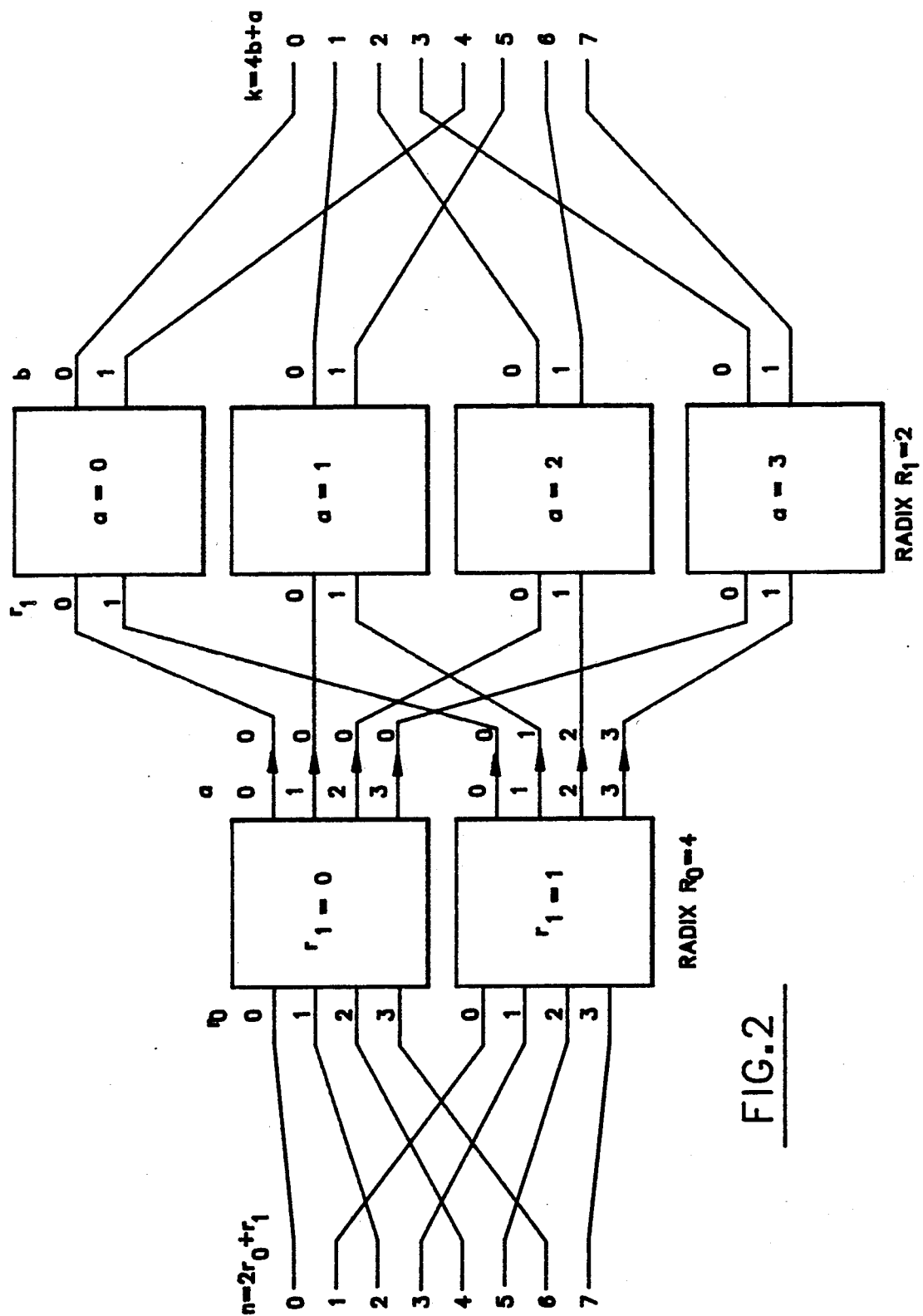
FIG. 2 illustrates an overview of decomposition of an 8-point transform DFT into a 2- and 4-point two-tier FFT module.
Figure 3:
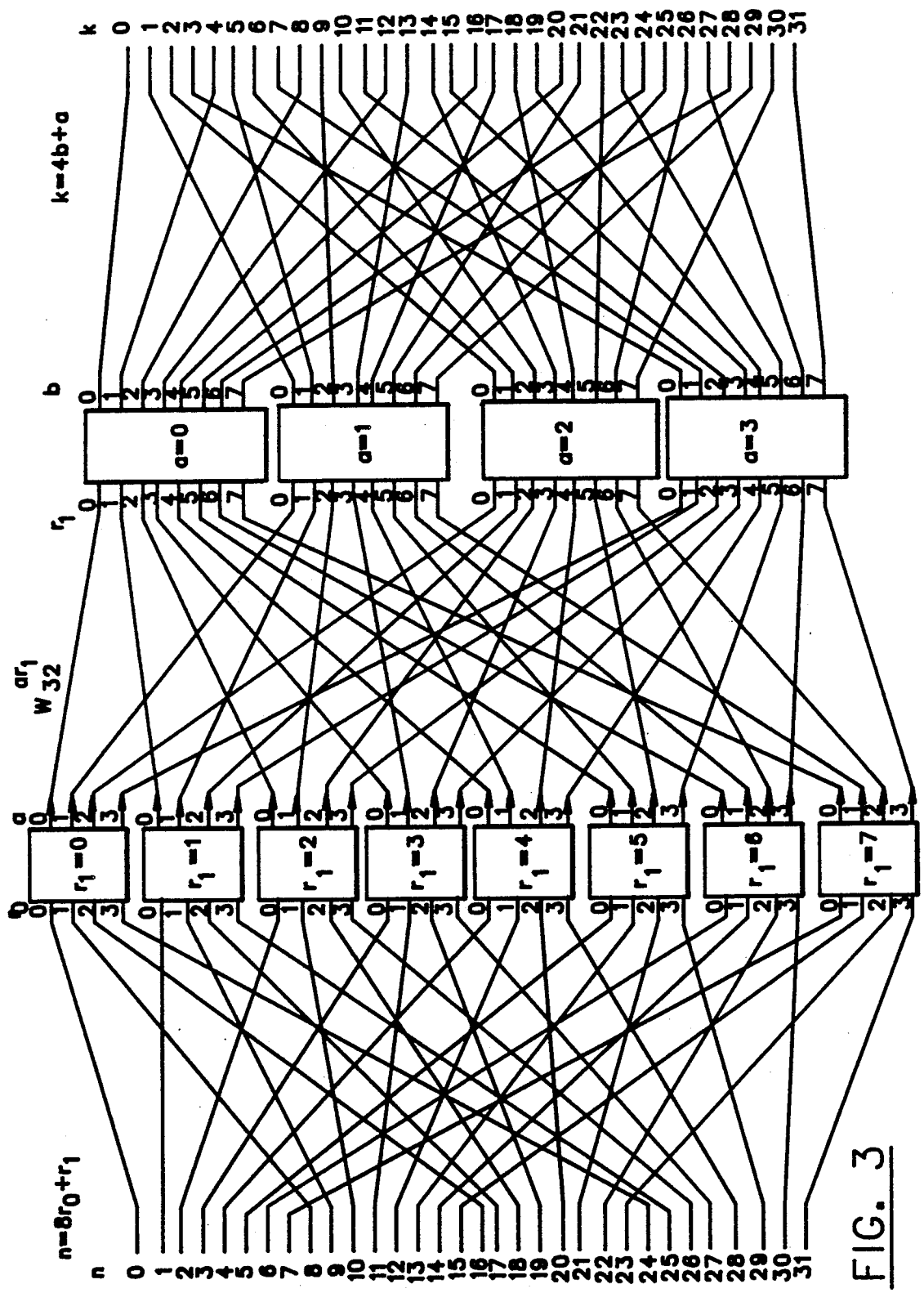
FIG. 3 illustrates an overview of decomposition of a 32-point transform DFT into a 4- and 8-point two-tier FFT module.

This equation describes the parameters of a two-tier FFT structure an example of which is illustrated in block diagram form in FIG. 1. From these examples, it is clear that any larger transformation size requirement of two raised to an integer power can be constructed from a series of 2- or 4-point FFTs. Appropriate block diagrams for such a series of FFT structures are illustrated in FIGS. 2 and 3 where the transforms are 8- and 32- point transforms, respectively, and the value of $R_o$ is 4 while the value of $R_1$ is 2, and 8, respectively.

Figure 4:
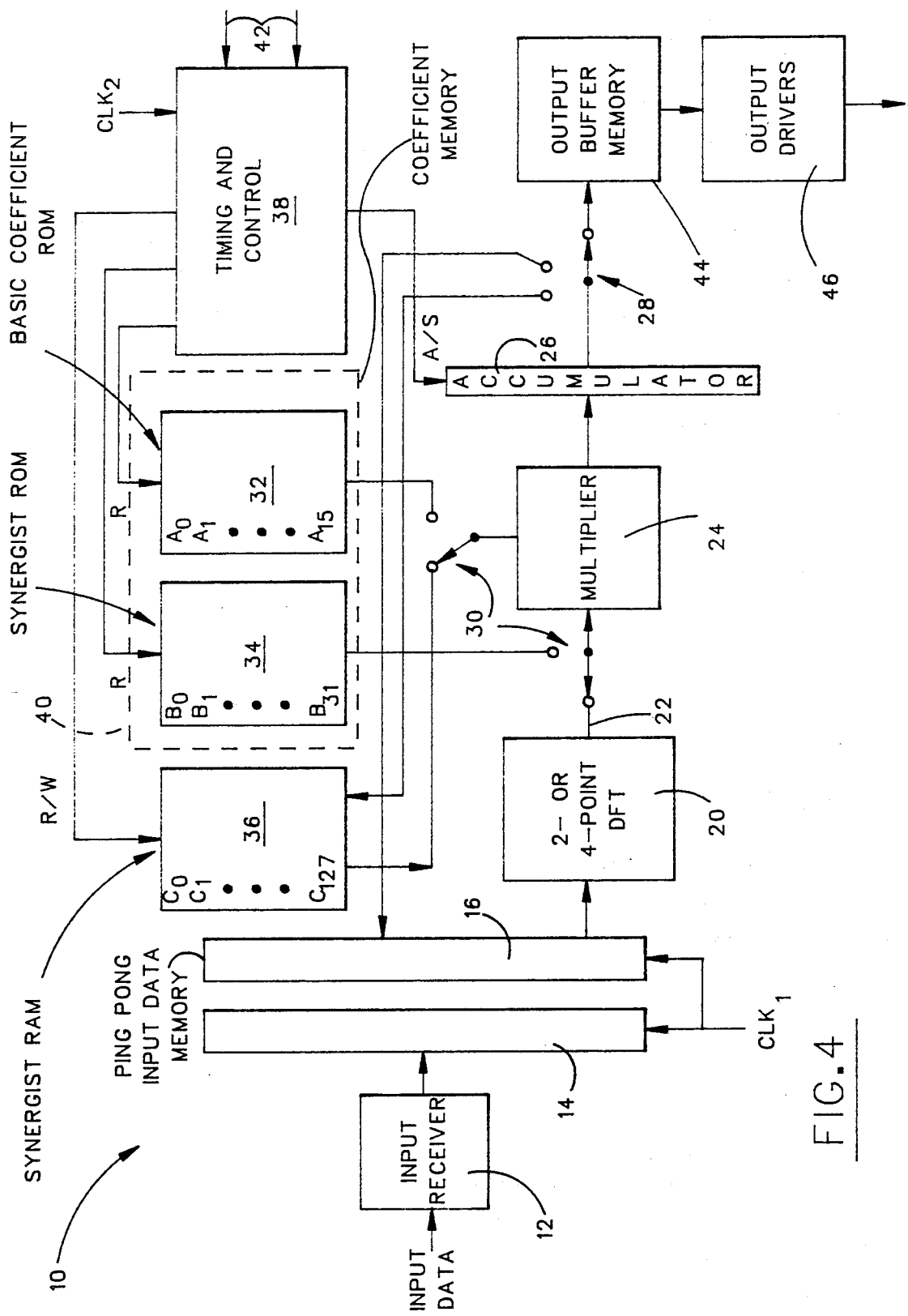
FIG. 4 illustrates a functional overview of a modular FFT processor constructed according to the principles of the present invention.

Using the above relationships for decomposition as a guide, a preferred embodiment of the invention was developed. The preferred embodiment of an arrayable, modular, FFT processor constructed and operating according to the present invention is illustrated in FIG. 4. The device shown in FIG. 4 is neither a microprocessor nor a dedicated functional component but rather a systolic-array processor for performing an FFT algorithm. Therefore, the device of FIG. 4 contains all functions in a single integrated circuit chip or chip set, including data storage, partial product storage, coefficient storage, address generation and arithmetic computations. When manufactured using 2.0–1.25 micron technology, such as in CMOS, a desired high speed and low power figure of merit is achieved that is about two orders of magnitude better than those which have been obtained in previous advanced designs.

In FIG. 4, the FFT processor 10 comprises an input receiver 12 which receives data that has been collected for a given processing application. The data may be received from a preprocessor or directly from an A/D converter. A typical format for this data is 32-bit words where 16 bits represent a real portion and the remaining 16 bits an imaginary portion of the data word. The arithmetic sections of the FFT processor 10 are designed to accommodate fixed-point 2's-complement data formatted as 15 bits-plus-sign for both real and imaginary input data points. This means that both the input and output data busses for arithmetic processing are typically 32 bits wide.

Where desired, the data is transferred in a parallel format or fashion from data collection and retrieval systems associated with the signal processing. In this case, the data receiver 12 provides an input register for accumulating the data at the parallel bus speed and transferring the data for processing in a bit-serial format at a different bus speed. The receiver element 12 can comprise a small buffer or other latch and transfer circuit as known in the art. The element 12 is provided to allow proper interfacing and timing with respect to outside input elements. However, those skilled in the art will recognize that a variety of elements can be used and this specific structure is not necessary for the operation of the invention itself.

An important feature is the bit-serial data exchange technique employed in implementing the invention. The data is transferred in a bit-serial fashion among all modules or processors in a FFT processor array. Word-serial, bit-parallel, data exchange requires using time-shared data busses which in turn require large output drivers, high speed data transfer on common busses and high power consumption to drive bus capacitance at high transfer speeds. The present invention, on the other hand, uses bit-serial transfers with their associated point-to-point wiring, low power drivers at low speeds, and resulting lower power consumption. The tradeoff is more complex wiring which is cheaper to implement versus higher cost coaxial cables etc., needed for the parallel transfers.

Data is generally received as 64 32 bit words with 16 bits being assigned (or reserved) to the real portion of a data point and 16 bits being reserved for the imaginary portion. The data is typically gathered (collected) using different data transfer or storage busses for the imaginary and real data. That is, the data is collected as a complex input signal with a real, or in-phase component, and a 90 degree out of phase quadrature signal which represents the imaginary portion of the data. Therefore, the present invention allows the introduction of the 16 bit real and imaginary portions of the data in parallel and storage as a single 32 bit data word.

The circuitry required to store or latch 64 words of 32 bits in length is well known in the art and requires only optimization in appropriate materials such as GaAs or CMOS or 1.2 mm NMOS for obtaining the desired transfer speeds involved at low power. However, the specific design is not critical in terms of the storage function.

The FFT processor 10 transfers incoming data from the receiver/buffer 12 to an input memory/buffer 14 which comprises a series of memory locations or registers in an array the size of the maximum amount of data to be accommodated by the apparatus 10. That is, the maximum number of points of data N determines the amount of memory in element 14. As previously stated, the preferred embodiment is configured to accommodate a 64-point data input pattern. However, where circuit elements exist which can accommodate larger amounts of data at very high speed with low power dissipation, the memory capacity of element 14 can be increased. The memory element 14 can comprise a series of memory registers, RAM circuits, or other storage elements familiar to those skilled in the art.

The incoming data is transferred into the input memory 14 in a predetermined sequence such as from top to bottom, bottom to top, etc., in order to store and retrieve the data points as required by the chosen FFT algorithm, or butterfly processing. The data is processed according to the previously discussed algorithms and needs to be retrieved in a predetermined pattern to satisfy processing input. An address-sequence memory or set of registers is used within the timing and control circuits 38 discussed below to coordinate the flow of data in and out of all memories for computations. There is a number of sequences for which the FFT processor 10 can be programmed based on the number of points in the transform and the position of the modular processor device within an overall array of devices.

The apparatus of the invention preferably employs a second input memory/buffer element 16 which is substantially a mirror image of memory 14 and provides further data storage and computational advantages. The data in the memory 14 can be transferred to the memory 16 to allow for additional input while processing occurs. Alternatively, the input data is initially stored in one of the two memories, here 14, and then retrieved and processed. During each processing stage or intermediate butterfly tier of the processing, the resulting data is then stored or written back into the other memory/buffer element, here 16. This retrieval and storage arrangement is alternated so that each memory is used to alternately fetch data from input receiver 12 or partially computed data from internal arithmetic elements. This "ping-pong" arrangement allows faster processing and decreases error in accounting for the storage of data. In addition, more data can be received and processed while the output data transfer rate remains somewhat low to match "local" data busses.

Each memory/buffer 14 or 16, contains 64 32-bit words with data being read into and out of each memory as 32-bit words. During a given epoch, one memory is writing data received from the A/D input ports, while the other memory is reading its contents to the internal arithmetic circuitry. These functions are then exchanged during the next epoch.

Figure 5A:
FIGS. 5a, 5b, and 5c illustrate the functional operation of a 2-point DFT useful in the apparatus of FIG. 4.
Figure 5A:
Figure 5B:
Figure 5B:
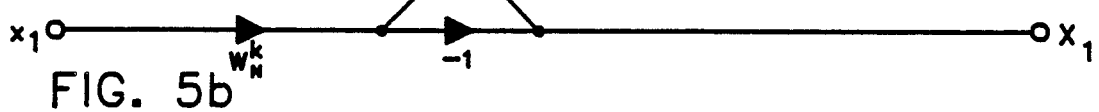
Figure 6A:
FIGS. 6a, 6b, and 6c illustrate the functional operation of a 4-point DFT useful in the apparatus of FIG. 4.
Figure 6A:
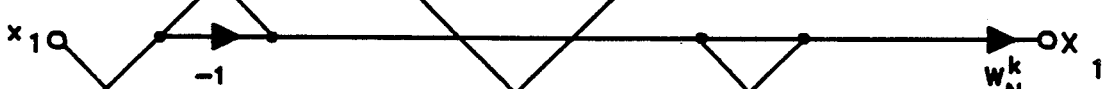
Figure 6A:
Figure 6A:
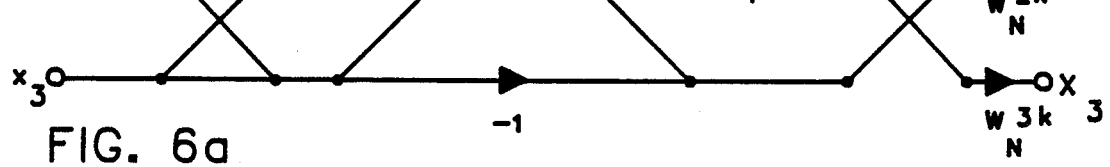
Figure 6B:
Figure 6B:
Figure 6B:
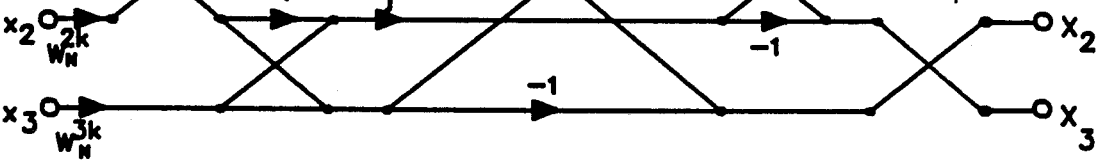
Figure 6B:
Figure 5C:
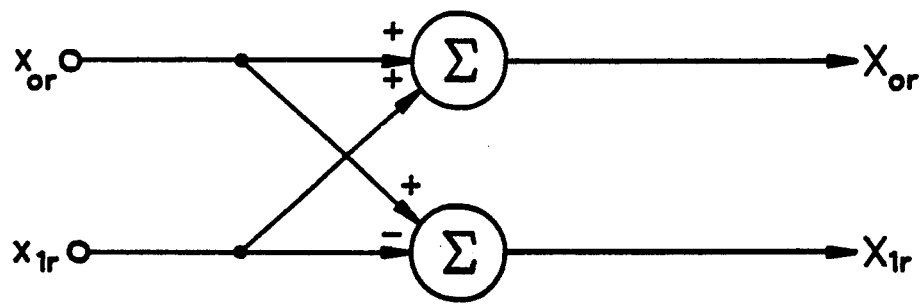
Figure 5C:
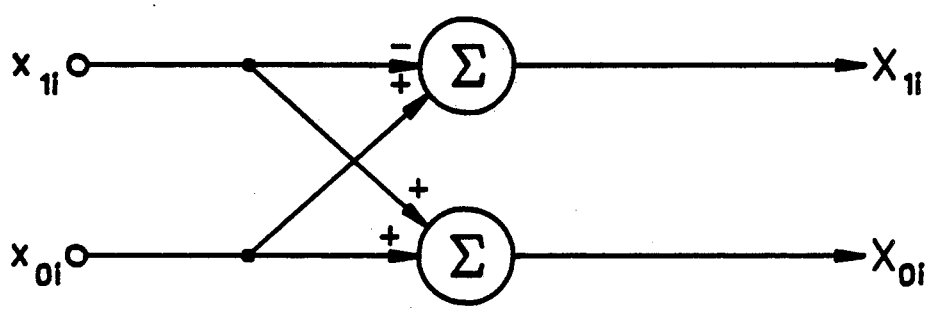
Figure 6C:
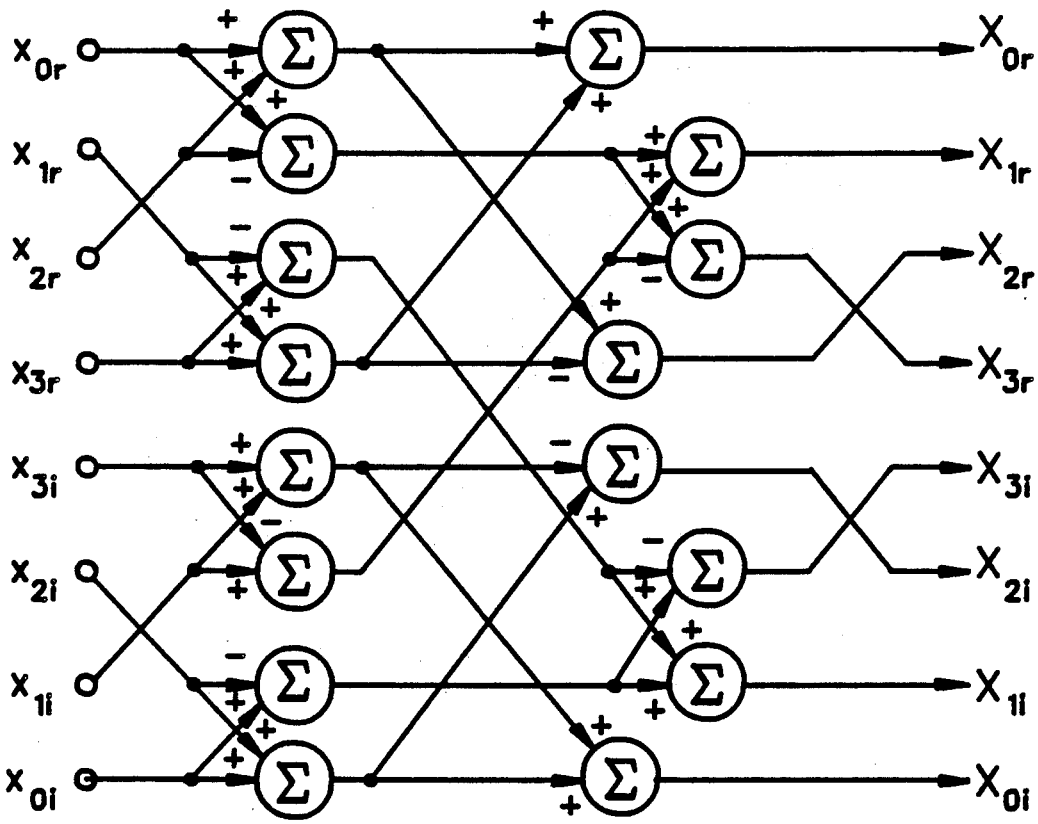
Figure 7A:
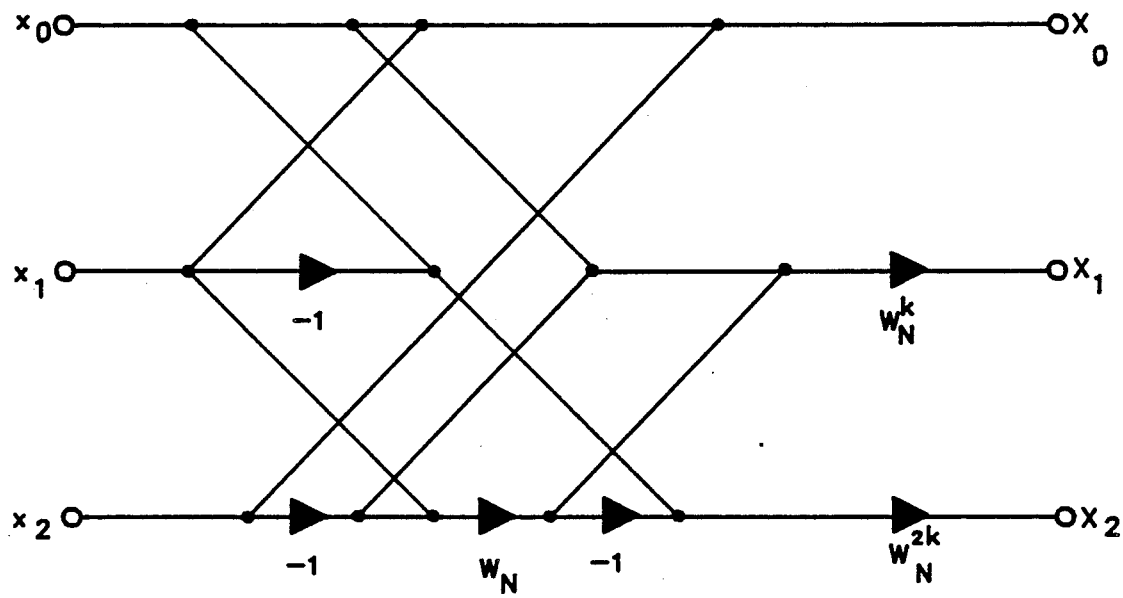
FIGS. 7a and 7b illustrate the functional operation of a 3-point DFT useful in the apparatus of FIG. 4.
Figure 7B:
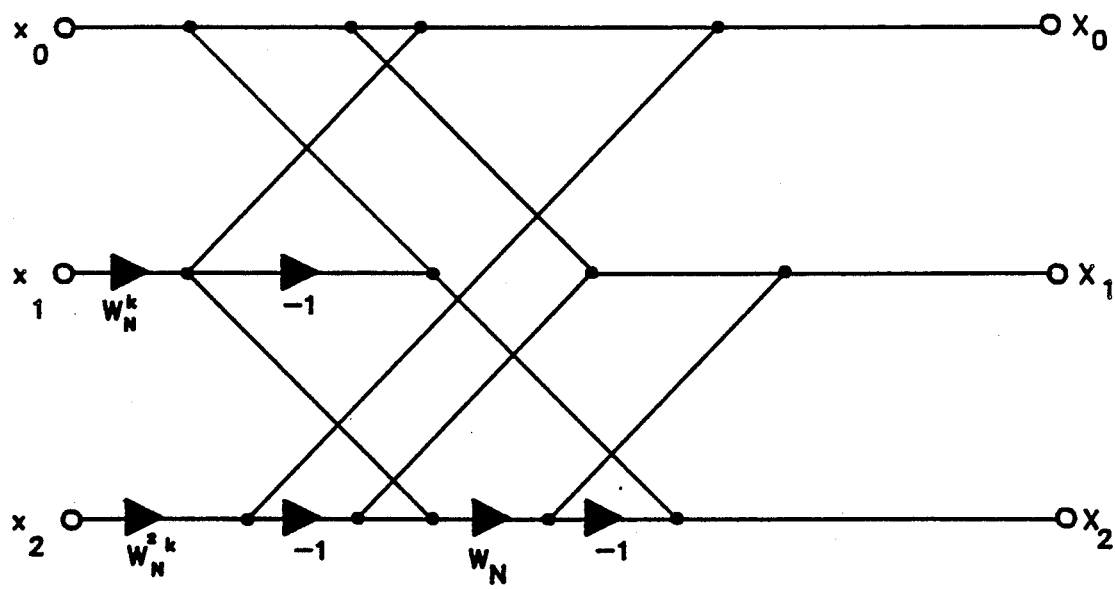

The data stored in the memories 14 or 16 is transferred through arithmetic processing elements where the individual FFT butterflies are computed. The main processing portion of the apparatus 10 comprises a dedicated, specialized 2- or 4-point DFT element 20 consisting of internal adders and subtractors. Those skilled in the art will readily understand how to construct such a device. Exemplary functional structures for 2-point, 3-point, and 4-point DFTs are illustrated in FIGS. 5, 6, and 7. FIGS. 5a, 6a, and 7a represent decimation-in-frequency configurations, and FIGS. 5b, 6b, and 7b represent decimation-in-time configurations. Twiddle-factor multiplications are labeled appropriately. FIGS. 5c and 6c show a more detailed illustration of the Radix-2 and Radix-4 operations using real and imaginary data values in accordance with the derivations discussed below.

For a Radix-2 transformation the above equations (2, 3) become:

$$X_k = \sum_{n=0}^{1} W_2^{nk} x_n = \sum_{n=0}^{1} (-1)^{nk} x_n = x_o + (-1)^k x_1$$

$$[W_2 = e^{-j2\pi/2} = -1]$$

with $$X_0 = (x_{0r} + x_{1r}) + j(x_{0i} + x_{1i}), \text{ and}$$

$$X_1 = (x_{0r} - x_{1r}) + j(x_{0i} - x_{1i})$$

A Radix-3 transformation, is expressed as:

$$X_k = \sum_{n=0}^{2} W_3^{nk} x_n \quad [W_3 = e^{-j2\pi/3}]$$

Figure 8A:
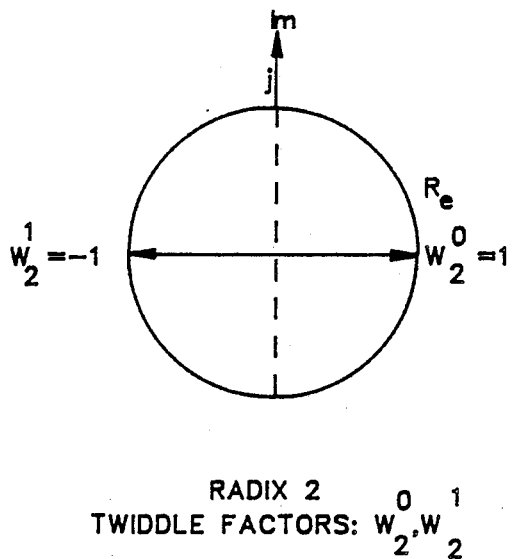
FIGS. 8a–8d illustrate the relationship between axes for radix-2, radix-3, radix-4, and radix-6 orthogonal systems.

Since $W_3^3 = 1$ and $W_3 \neq 1$, it can be shown that $W_3^2 = -1 - W_3$. If the complex data samples are conventionally defined as: $x_n = x_{nR} + jx_{nI}$, then a new coordinate system $(1, W_3)$ which is non-orthogonal can be defined as shown in FIG. 8b. Data in the new coordinate system is expressed in the form $y_{nR} + W_3 y_{nI}$ and the relationships between data are described by the expressions:

$$x_n = x_{nR} + jx_{nI}$$
$$= y_{nR} + W_3 y_{nI}$$
$$= (y_{nR} - 1/2 y_{nI}) - j\sqrt{3/2} (y_{nI})$$

which provides for transformations between the conventional coordinate system $(1, W_1)$, shown in FIG. 8a, and the new system $(1, W_3)$ of:

$$\begin{bmatrix} y_{nR} \\ y_{nI} \end{bmatrix} = \begin{bmatrix} 1 & -1/\sqrt{3} \\ 0 & 2/\sqrt{3} \end{bmatrix} \begin{bmatrix} x_{nR} \\ x_{nI} \end{bmatrix} \text{ and}$$

$$\begin{bmatrix} x_{nR} \\ x_{nI} \end{bmatrix} = \begin{bmatrix} 1 & -1/2 \\ 0 & -\sqrt{3/2} \end{bmatrix} \begin{bmatrix} y_{nR} \\ y_{nI} \end{bmatrix}$$

The complex multiplication $(a + bW_3)(c + dW_3)$, required for the transformation, reduces to:

$$ac + W_3(ad + bc) + W_3^2 bd = (ac - bd) + W_3 \cdot [(a+b)(c+d) - ac - 2bd]$$

The transformation results in three real multiplies, two real additions, three real subtractions, and one phase shift. Conjugation for the phase shift can be expressed as:

$$(a + bW_3)^* = a + bW_3^* = a + bW_3^2 = a + b(-1 - W_3)$$
$$= (a - b) - bW_3$$

therefore, the DFT operation is accomplished without any multiples and is formed from the expressions:

$$X_0 = (x_{0r} + x_{1r} + x_{2r}) + j(x_{0i} + x_{1i} + x_{2i})$$
$$= (y_{0r} + y_{1r} + y_{2r}) + W_3(y_{0i} + y_{1i} + y_{2i}),$$

$$X_1 = (y_{0r} + W_3 y_{1r} + W_3^2 y_{2r}) + W_3^2 (y_{0i} + W_3 y_{1i} + W_3^2 y_{2i})$$
$$= (y_{0r} - y_{1i} - y_{2r} + y_{2i}) + W_3 (y_{0i} + y_{1r} - y_{1i} - y_{1i}), \text{ and}$$

$$X_2 = (y_{0r} + W_3^2 y_{1r} + W_3^4 y_{2r}) + W_3 (y_{0i} + W_3^2 y_{1i} + W_3^4 y_{2i})$$
$$= (y_{0r} - y_{1r} + y_{1i} - y_{2i}) + W_3(-y_{1r} + y_{0i} + y_{2r} + y_{2i})$$

For a Radix-4 transformation the equations become:

$$X_k = \sum_{n=0}^{3} W_4^{nk} x_n = \sum_{n=0}^{3} (-j)^{nk} x_n \quad [W_4 = e^{-j2\pi/4} = -j]$$

$$X_0 = x_0 + x_1 + x_2 + x_3 = (x_0 + x_2) + (x_1 + x_3) =$$
$$[(x_{0r} + x_{2r}) + (x_{1r} + x_{3r})] + j[(x_{0i} + x_{2i}) + (x_{1i} + x_{3i})],$$

$$X_1 = [(x_{0r} - x_{2r}) + (x_{1i} - x_{3i})] + j[(x_{0i} - x_{2i}) - (x_{1r} - x_{3r})]$$

$$X_2 = [(x_{0r} + x_{2r}) - (x_{1r} + x_{3r})] + j[(x_{0i} + x_{2i}) - (x_{1i} + x_{3i})]$$

and $$X_3 = [(x_{0r} - x_{2r}) - (x_{1i} - x_{3i})] + j[(x_{0i} - x_{2i}) + (x_{1r} - x_{3r})]$$

Figure 8C:
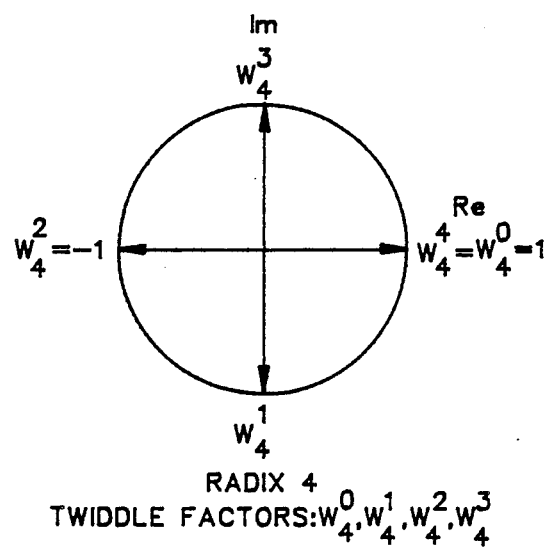
Figure 8B:
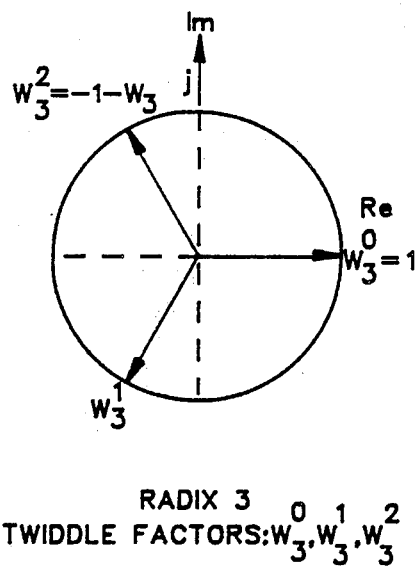
Figure 8D:
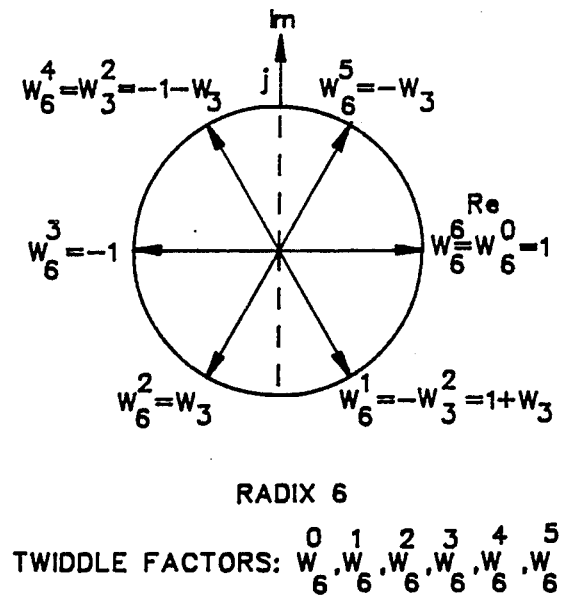

The extension of the Radix-3 twiddle factors and their negatives can be used to develop a Radix-6 coordinate system and resulting equations for transformations. The coordinate system $(1, W_6)$ is shown in FIG 8c and the expansion equations below.

$$X_k = \sum_{n=0}^{5} W_6^{nk} x_n \quad [W_6 = e^{-j2\pi/6}]$$

$$X_0 = (y_{0r} + y_{1r} + y_{2r} + y_{3r} + y_{4r} + y_{5r}) + W_3(y_{0i} + y_{1i} + y_{2i} + y_{3i} + y_{4i} + y_{5i}),$$

-continued $$X_1 = (y_{0r} + W_6 y_{1r} + W_6^2 y_{2r} + W_6^3 y_{3r} + W_6^4 y_{4r} +$$
$$W_6^5 y_{5r}) + W_3(y_{0i} + W_6 y_{1i} + W_6^2 y_{2i} + W_6^3 y_{3i} +$$
$$W_6^4 y_{4i} + W_6^5 y_{5i})$$
$$= (y_{0r} + y_{1r} - y_{1i} - y_{2i} - y_{3r} - y_{4r} + y_{5i}) +$$
$$W_3(y_{0i} + y_{1r} + y_{2r} - y_{2i} - y_{3i} - y_{4r} - y_{5r} + y_{5i}),$$

$$X_2 = (y_{0r} + W_6^2 y_{1r} + W_6^4 y_{2r} + W_6^6 y_{3r} + W_6^8 y_{4r} +$$
$$W_6^{10} y_{5r}) + W_3(y_{0i} + W_6^2 y_{1i} + W_6^4 y_{2i} + W_6^6 y_{3i} +$$
$$W_6^8 y_{4i} + W_6^{10} y_{5i})$$
$$= (y_{0r} - y_{1i} - y_{2r} + y_{2i} + y_{3r} - y_{5r} + y_{5i}) +$$
$$W_3(y_{0i} + y_{1r} - y_{1i} - y_{2r} + y_{3i} + y_{4r} - y_{4i} - y_{5r}),$$

$$X_3 = (y_{0r} + W_6^3 y_{1r} + W_6^6 y_{2r} + W_6^9 y_{3r} + W_6^{12} y_{4r} +$$
$$W_6^{15} y_{5r}) + W_3(y_{0i} + W_6^3 y_{1i} + W_6^6 y_{2i} + W_6^9 y_{3i} +$$
$$W_6^{12} y_{4i} + W_6^{15} y_{5i})$$
$$= (y_{0r} - y_{1r} + y_{2r} - y_{3r} + y_{4r} - y_{5i}) +$$
$$W_3(y_{0i} - y_{1i} + y_{2i} - y_{3i} + y_{4r} - y_{5i}),$$

$$X_4 = (y_{0r} + W_6^4 y_{1r} + W_6^8 y_{2r} + W_6^{12} y_{3r} + W_6^{16} y_{4r} +$$
$$W_6^{20} y_{5r}) + W_3(y_{0i} + W_6^4 y_{1i} + W_6^8 y_{2i} + W_6^{12} y_{3i} +$$
$$W_6^{16} y_{4i} + W_6^{20} y_{5i})$$
$$= (y_{0r} + y_{1r} + y_{1i} + y_{2i} + y_{3r} + y_{4r} + y_{4i} + y_{5i}) +$$
$$W_3(y_{0i} - y_{1r} + y_{2r} - y_{2i} + y_{3i} - y_{4r} + y_{5r} - y_{5i}),$$

and $$X_5 = (y_{0r} + W_6^5 y_{1r} + W_6^{10} y_{2r} + W_6^{15} y_{3r} + W_6^{20} y_{4r} +$$
$$W_6^{25} y_{5r}) + W_3(y_{0i} + W_6^5 y_{1i} + W_6^{10} y_{2i} + W_6^{15} y_{3i} +$$
$$W_6^{20} y_{4i} + W_6^{25} y_{5i})$$
$$= (y_{0r} + y_{1i} - y_{2r} + y_{2i} - y_{3r} + y_{5r} - y_{5i}) +$$
$$W_3(y_{0i} - y_{1r} + y_{1i} - y_{2r} - y_{3i} + y_{4r} - y_{4i} + y_{5i})$$

From this information those skilled in the art can readily understand the basis for choosing and constructing the desirable DFT circuitry.

In choosing to implement a given transform in radix-2, radix-3, radix-4, or radix-6, it is important to remember the difference in the number of complex multiplies required between these radix values. A DFT computation requires $N^2$ butterfly computations, complex multiplication and associated additions, to obtain the complex amplitude of N transform points in the frequency domain. The FFT is a highly efficient algorithm for computing the DFT and requires only $N/R \log_R N$ butterflies, where R is the radix size which is the number of complex data words involved in each butterfly. A higher radix requires fewer total computations but more circuitry to hold the data undergoing multiplication and accumulation. However, utilizing very fast circuitry, the throughput achieved with the lower computational requirements of higher radix computations is still greater.

The number of complex multiplies per transform for 64 and 4096-point DFTs are 3969 and 16,796,025 respectively, while radix-2 and radix-4 FFTs require 155 or 90 complex multiplies for 64-point transforms and 22,517 or 15,345 multiplies for 4096-point transforms. There are N/R butterflies per data pass or tier with all but 1 of these requiring R-1 complex multiplies for a total of (N/R-1)(R-1) complex multiplies per tier. With $\log_R N$ tiers, one of which does not use complex multiplies, there are (N/R-1)(R-1)($\log_R N$-1) complex multiplies in an N-point radix-R transform.

Returning now to FIG. 4, the DFT processor 20 is connected through a data bus 22 to a multiplier 24 and an accumulator 26. The accumulator 26 is alternatively connected through a switching element 28 to either an output buffer memory 44, the input buffer memories 14, 16, or a synergist storage element 36. The multiplier 24 is in turn connected through a switching element 30 to a series of coefficient storage elements 32, 34, and 36.

The multiplier is configured to multiply 15 data bits, plus sign, times 15 data bits plus sign. The preferred multiplier employs a modified Booth's algorithm and is double pipelined to enhance throughput. The multiplier output comprises the sign bit plus the 15 Most Significant Bits (MSB) from the resulting multiplication products which are 32 bits in size. The 15 least significant bits (LSB) are not transferred out of the multiplier but are used in an internal operation to adjust the value of the 16th LSB, where the value of the remaining least significant bits are equal to, or greater than, the 15th LSB data bit. This rounding procedure is symmetrical around 2's-complement zero, and helps minimize noise-bias build-up. At the same time, every 4-point DFT output is shifted by two binary places, or bit positions, to effect a divide-by-4 operation, and prevent overflow.

The coefficient storage elements, 32, 34, and 36 comprise a series of memory registers, ROM circuits, RAM circuits or other storage elements familiar to those skilled in the art. In the preferred embodiment, the elements 32 and 34 comprise ROM circuits and element 36 comprises a high speed RAM circuit.

The first coefficient element 32 contains basic butterfly coefficient or twiddle factor data which is predetermined by the radix number selected, basic algorithms used to compute that radix, and number of points the apparatus 10 is to accommodate. A series of positionally sensitive coefficients (array position), labeled as synergist coefficients, are stored in the synergist ROM element 34 and used to adjust the values of the basic coefficients in the coefficient ROM 32 to account for the exact position each processor module 10 has in an array of z such modules for processing larger numbers of points or data.

The overall coefficient memory 40 contains both the basic coefficients ($N \leq 64$) and the synergistic coefficients ($N > 64$). For the radix-2 and radix-4 case, the normal coefficients consist of seventeen words (the value of $\cos k\pi/32$, where $k = 0, 1, 2, 3, 4, \ldots 16$, including 0 and 1) representing the phase-adjusting factors required to execute butterfly computations. The basic memory element 34 holds twiddle factors for all power-of-two (or power-of-three, power-of-four, power-of-six) FFTs between 8- and 64-points. The coefficients are stored, generally as 16 (for the radix-2 and radix-4 case), 16-bit (all real) words in the basic coefficient ROM 32 and are fixed values, not dependent upon any other factors.

The synergist ROM, 34, contains 32 complex data words of 32- bits each which are multiplied times the basic values to generate required twiddle-factors. This latter step is accomplished by multiplying the values pre-stored in the ROM 32 by the synergist factors stored in the ROM 34 and storing the results in a memory element 36. This memory element comprises circuitry known in the art such as a high speed RAM circuits. The adjusted twiddle factors now stored in the RAM 36 allow computation of the desired radix butterflies with true positional sensitivity or correctness.

The synergistic coefficients in the synergist RAM, 36, consist of 64 complex words, which represent the phase shifts required for the last pass butterfly computations which are required only when the FFT processor 10 is used within an array of processors performing transformations with N greater than 64. The purpose of these coefficients is to phase shift the data appropriately, depending upon the position of a specific FFT processor 10 within the array. Synergistic coefficients, obviously vary depending upon processor or device position.

The FFT processor 10 is provided with programmable pin or interface connections 42 to allow automatic addressing of the data stored in the ROM 34 according to the position of the arrayable device. That is, once the position of the device or processor 10 in an array of z processors ($z=1$ to 64) is selected on an input control line or set of pins 42, the incremental adjusting coefficients to be supplied by the ROM 34 are automatically determined. Therefore, the processor 10 position automatically determines the synergist ROM data used to update the basic coefficient data and prepare the synergist RAM 36 data at initialization or initial start-up of the processor 10 (or an array of processors). The RAM element 36 then contains a unique set of 64 complex synergistic coefficients.

It can be seen that the multiplier 20 consumes a certain amount of energy preparing the data stored in the synergist RAM 36. However, this energy is consumed only once, and at a time when no other processing is taking place and represents a small energy burden compared to the overall power consumption during data processing. Once the desired synergist coefficients are stored in the RAM 36, the selection positions of the switching elements 28 and 30 are changed and processing can commence on stored data.

Two clock signals are generally used to operate the processor 10. One clock functions as an I/O clock and synchronizes the transfer of input time sample data into the input storage memory/buffers on a 32-bit wide input data bus. This clock is generally synchronous with each input sample from A/D preprocessing but is asynchronous to the arithmetic operations. That is, the speed of the I/O clock is synchronous with the A/D sample rate. The I/O clock signal also synchronizes the transfer of output frequency data into output storage memory/buffers.

The I/O timing circuits are typically configured so that when the I/O clock signal makes a transition from high to low logic levels, sample data is transferred into the FFT device 10. This will generally require stabilization of all the data before transfer commences. The I/O clock may run continuously or may have dead time associated with the period between the end of one epoch and the start of another.

A second timing signal in the form of an Arithmetic-Processing (AP) clock signal, is applied to an input of the arithmetic circuitry used to compute the DFT and FFT butterflies, and may be asynchronous with the I/O clock signal. The maximum AP clock speed is limited by the longest propagation delay path within the internal arithmetic logic circuitry. This is a variable period dependent upon temperature, bias voltage, the device technology, and device processing quality. For example, using a 2 $\mu$m CMOS process developed by Rockwell International, the maximum AP clock rate is expected to be about 40 MHz under normal conditions of $+25°$ C., 5.0 volts bias, and normal processing quality.

The AP clock is adjusted to leave the arithmetic circuitry in an idle configuration after it completes internal computations and prior to the beginning of the next epoch. While clock pulses may still be applied during this period they are not used to accomplish any further computations. The minimum speed is established by the number of AP pulses required to complete all butterfly computations within a given epoch.

In a preferred embodiment, an epoch-start input signal is used which has a high logic level after the last I/O clock in the preceding epoch goes logic-low. This signal then goes logic-low after the first I/O clock signal pulse in the new epoch. Cycle periods of the epoch-start input pulse should be equal to, or longer than, the time required for completion of internal arithmetic computations.

The time required to complete an epoch depends upon the transform size, the matrix configuration, the arithmetic-clock rate, operating temperature, power-supply bias voltage, and speed-dependent processing parameters. Nominal epoch durations have been computed for the present invention and are summarized in Table I, where the operating temperature is assumed to be 25° C. and 5 volts bias with nominal processing parameters.

TABLE I

| Transform Size | Modules used | Epoch Time ($\mu$s) | Word-Serial Sample Rate (MS/s) | Bit-Serial Data Rate (Mb/s) | Power Watts |
| --- | --- | --- | --- | --- | --- |
| 16 | 1 | 4 | 4.0 | 12.0 | 0.5 |
| 32 | 1 | 10 | 3.2 | 5.0 | 0.5 |
| 64 | 1 | 19 | 3.4 | 2.6 | 0.5 |
| 128 | 4 | 19 | 6.7 | 2.6 | 2.0 |
| 256 | 8 | 19 | 13 | 2.6 | 4.0 |
| 512 | 16 | 19 | 27 | 2.6 | 8.0 |
| 1024 | 32 | 19 | 54 | 2.6 | 16.0 |
| 2048 | 64 | 38[1] | 54 | 1.3 | 32.0 |
| 4096 | 128 | 76[1] | 54 | 0.67 | 64.0 |

[1] values shown are for input data loaded from a common parallel bus. Serial loading of data from a buffer can reduce these epoch times to 19 $\mu$sec.

An epoch latency of two is required for FFT processing. That is, two additional epochs are required before a set of N frequency data samples are generated from a corresponding set of N time data samples.

In preferred embodiments, the logic elements used are static, that is, require no refresh cycles, so that unlimited amounts of dead-time between epoch cycles can be accommodated.

Returning again to FIG. 4, the use of input-data, output-data, and address-sequence memories within the FFT processor 10 is an extremely important architectural feature. Although the implementation of these memories consumes valuable real estate which impacts on integrated chip size and cost, these disadvantages are more than offset by the increased performance due to elimination of off-chip information and addressing storage. The use of off-chip storage is one of the greatest hardware problems, in terms of power, speed, etc., with current FFT processor designs.

The circuitry of FIG. 4 is designed, but not limited, to be implemented with CMOS technology which consists of at least 2-layer metallization and 2 micrometer via sizes. Using typical manufacturing parameters for device dimensions, n and p channel devices with 1.0 volt nominal threshold voltages and breakdown voltages of about 8.0 volts provide estimated power losses of 1 milliwatt leakage, 184 milliwatts charging power, 146 milliwatts shorting power at speed, and about 137 milliwatts of output-driver-power loss.

The complex-data from the 4-point DFT is generally presented in the form $A+jB$. This data is then multiplied by the complex twiddle factor $W_N^{k_0} = \cos 2\pi k_0/N - j\sin 2\pi k_0/N$ from the synergist RAM 36, which results in the product:

$$(A+jB)(\cos 2\pi k_o/N - j\sin 2\pi k_o/N) = A\cos 2\pi k_o/N + B\sin 2\pi k_o/N + jB\cos 2\pi k_o/N - jA\sin 2\pi k_o/N \quad (7)$$

It is well understood that there is redundancy in the sine and cosine information due to the cyclical behavior of these functions. Therefore, the data from one quadrant of the $\cos 2\pi k_o/N$ function can be stored and the desired information for the remaining quadrants and the sine function derived using the relationships:

| Quadrant | $k_1$ | $k_2$ |
|---|---|---|
| I | $k_0$ | $N/4-k_0$ |
| II | $N/2-k_0$ | $k_0-N/4$ |
| III | $k_0-N/2$ | $3N/4-k_0$ |
| IV | $N-k_0$ | $k_0-3N/4$ |

| Quadrant | $\cos 2\pi k_0/N$ | $\sin 2\pi k_0/N$ |
|---|---|---|
| I | $\cos 2\pi k_1/N$ | $\cos 2\pi k_2/N$ |
| II | $-\cos 2\pi k_1/N$ | $\cos 2\pi k_2/N$ |
| III | $-\cos 2\pi k_1/N$ | $-\cos 2\pi k_2/N$ |
| IV | $\cos 2\pi k_1/N$ | $\cos 2\pi k_2/N$ |

Using these relationships, the result of the complex multiplication of equation 7 above by quadrant, using the value of the most significant bit from $k_o$ for selection, is:

| $k_0$ | Quad | Real Portion | Imaginary Portion |
|---|---|---|---|
| 00 | I | $A\cos 2\pi k_1/N + B\cos 2\pi k_2/N$ | $B\cos 2\pi k_1/N - A\cos 2\pi k_2/N$ |
| 01 | II | $-A\cos 2\pi k_1/N + B\cos 2\pi k_2/N$ | $-B\cos 2\pi k_1/N - A\cos 2\pi k_2/N$ |
| 10 | III | $-A\cos 2\pi k_1/N - B\cos 2\pi k_2/N$ | $-B\cos 2\pi k_1/N + A\cos 2\pi k_2/N$ |
| 11 | IV | $A\cos 2\pi k_1/N - B\cos 2\pi k_2/N$ | $B\cos 2\pi k_1/N + A\cos 2\pi k_2/N$ |

If $C(k)$ is defined as $\cos 2\pi k/N$ and we look at both the most significant bits (MSB) and the Next Most-Significant Bits (NMSB), then this table can be reduced to the expression:

$$\text{PRODUCT} = \{[MSB \oplus \overline{NMSB}] \cdot [A \cdot C(k_1)] + [MSB - MSB][B \cdot C(k_2)]\} + j\{[MSB \oplus NMSB - MSB \oplus NMSB] \cdot [B \cdot C(k_1)] + [MSB - \overline{MSB}][A \cdot C(k_2)]\}$$

Figure 9:
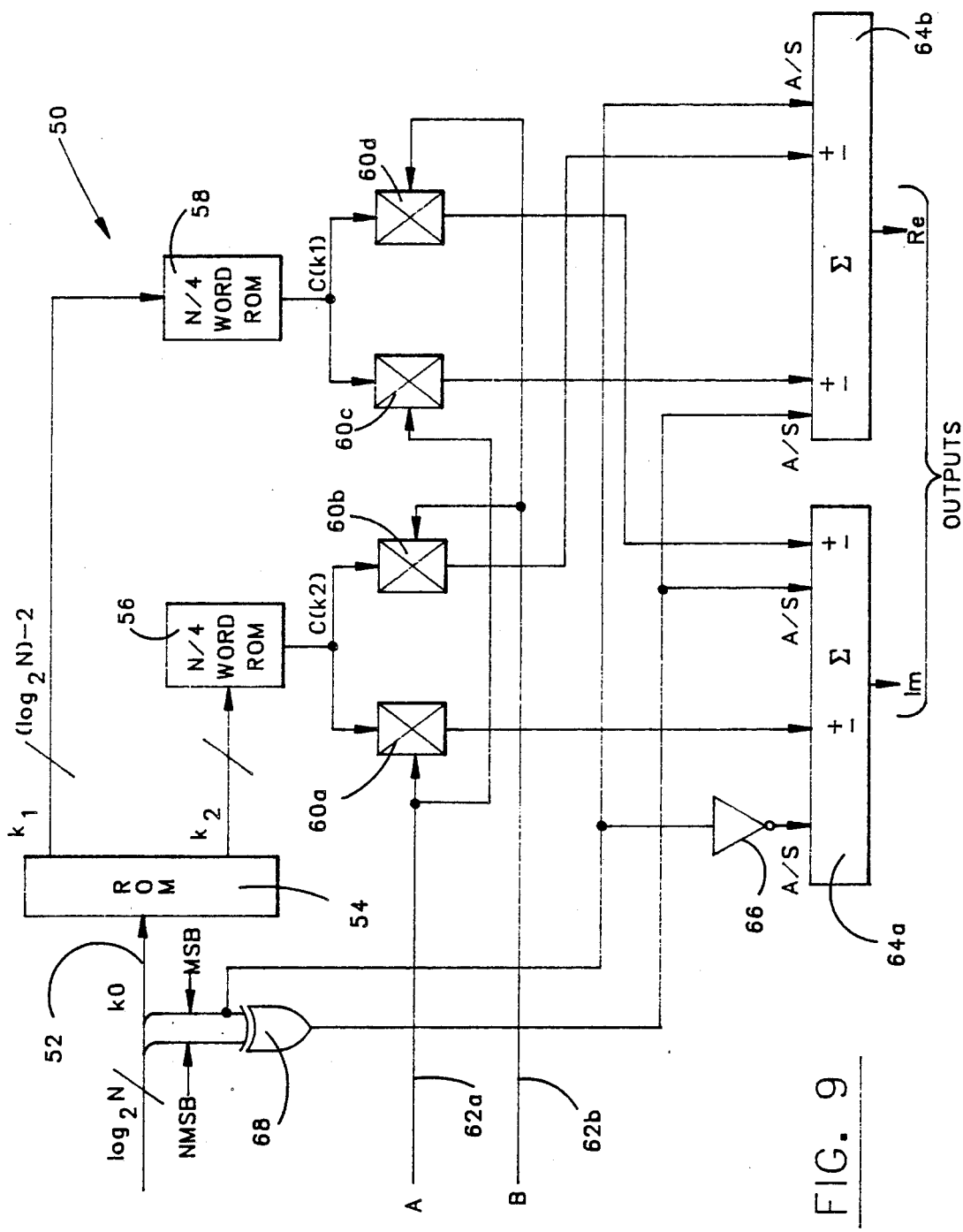
FIG. 9 illustrates a twiddle factor processor useful in generating the twiddle factors used in the processor of FIG. 4.

These products can be stored as a series of values assigned to each quadrant so that the relative magnitude of the k vector selects that value during processing. An apparatus and method for implementing the complex multiplication operation in the present invention is shown in FIG. 9. This is a direct implementation of the equation which is given above.

In FIG. 9, the complex multiplier 50 is shown using a $\log_2 N$-bit-wide input line 52 for receiving a signal indicating the value of the twiddle-factor exponent, $k_o$. The value for $k_o$ is transferred into a storage element such as a ROM 54 which treats this input as an address. The address applied to the ROM 54 selects the values of $k_1$ and $k_2$ which are transferred as address values to two N/4 word memory elements such as RAMs 58 and 56, respectively. The addresses select appropriate values for $C(k)$ according to the function $\cos 2\pi(k_1$ and $k_2)$ which are then transferred to the four multipliers 60 (60a, 60b, 60c, or 60d) used in the multiplier 50.

The data values for A and B are transferred into the complex multiplier 50 via the data lines 62a and 62b and applied to the multipliers 60a, 60c and 60b, 60d, respectively. This provides the products which are then summed to provide the final result. The summation is accomplished by transferring the products from the multipliers 60 to a pair of accumulators 64 (64a and 64b). A single control line labeled A/S, paired with each real-multiplier output, determines whether an accumulator adds or subtracts the appropriate input products. The A/S signal is determined by the most significant bit of the input points, the inverse of the MSB input, and the output of an exclusive OR gate 68 which examines the MSB and the next most significant bits.

Figure 10:
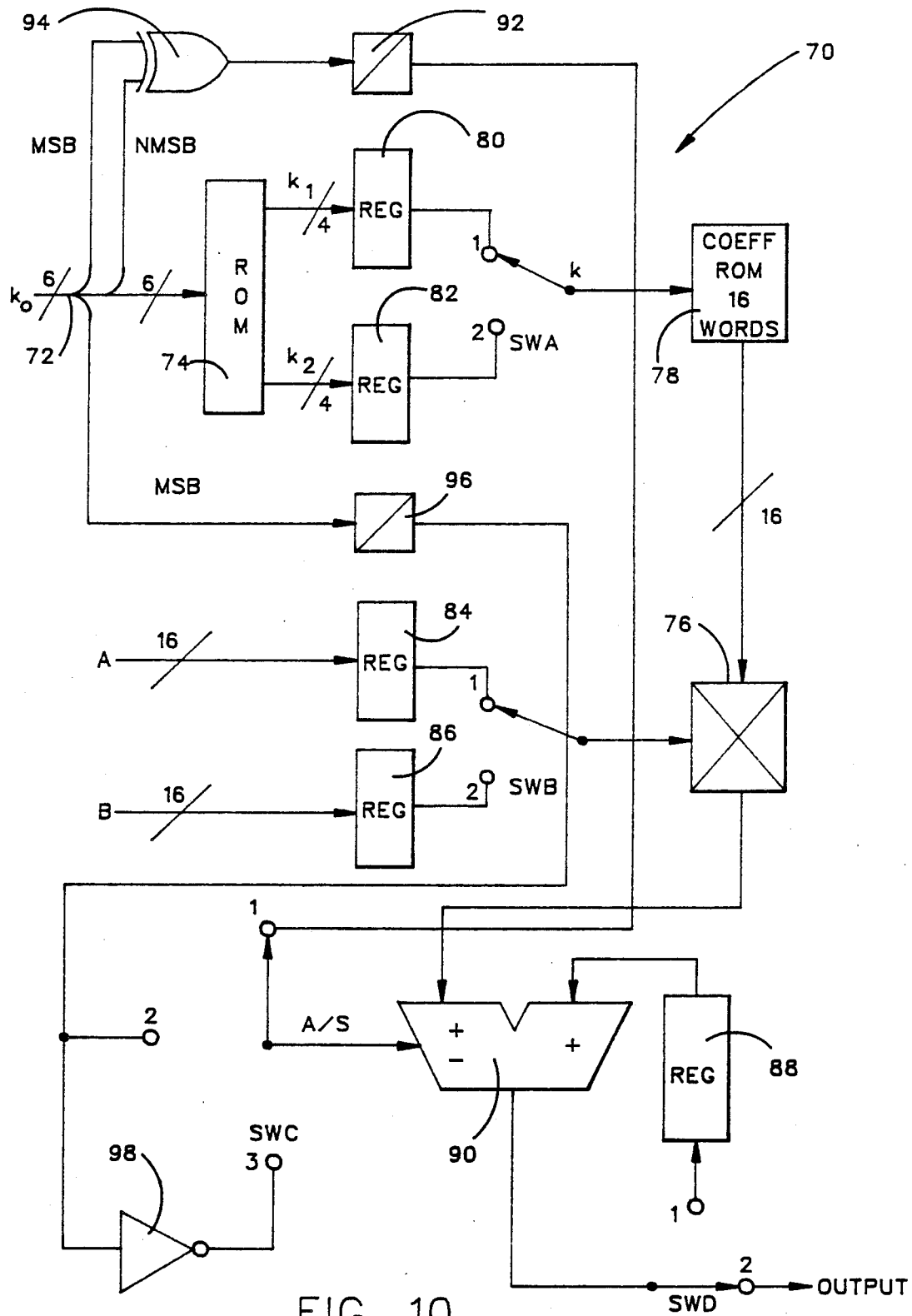
FIG. 10 illustrates a multiplier useful in generating the positional adjustment factors useful for the processor of FIG. 4.

In order to reduce the overall circuitry contemplated for the invention, the memory and multiplier can be time shared according to the example illustrated in FIG. 10. In FIG. 10, a single multiplier element 76 is used to replace the four multipliers 60a, 60b, 60c and 60d shown n FIG. 9. The N/4 word ROMs 56 and 58 are replaced by a single memory element 78. A multiplexing switch SWA alternately connects the output of two $k_1$ and $k_2$ registers, 80 and 82 to the coefficient ROM 78 for addressing the ROM contents. The output of the ROM 78 is provided to the multiplier 76 for combination with data elements A and B which are selected by a second multiplexing switch SWB from the data input registers 84 and 86.

A third multiplexing switch SWC selects one of three sources as the control for selecting addition or subtraction (A/S) in the accumulator 90. A fourth multiplexing control switch SWD controls the alternate connection of the accumulator 90 output between an output data bus or a holding register 88. The contents of the register 88 are transferred back into the accumulator 90 when needed to complete the summation process for the FFT butterflies.

The sequence of operations of the multiplexing switches for this time sharing arrangement of the multiplier 76 and ROM 78 is shown in Table II. Four clock periods are required to complete one product cycle using this scheme.

TABLE II

| SWA | SWB | SWC | SWD | OUTPUT |
|---|---|---|---|---|
| 1 | 1 | 1 | 1 | — |
| 2 | 2 | 2 | 2 | REAL |
| 1 | 2 | 1 | 1 | — |
| 2 | 1 | 3 | 2 | IMAG |

Using this arrangement the values of $k_o$ for 32-point and 64-point transforms for first and second passes are provided in Table III below.

TABLE III

| 32 Point Transforms Pass | | 64 Point Transforms Pass | | | |
|---|---|---|---|---|---|
| 1 | 2 | 1 | 1(Cont) | 2 | 2(Cont) |
| 0 | 0 | 0 | 0 | 0 | 0 |
| 0 | 0 | 0 | 0 | 0 | 0 |

TABLE III-continued

| 32 Point Transforms Pass | | 64 Point Transforms Pass | | | |
| --- | --- | --- | --- | --- | --- |
| 1 | 2 | 1 | 1(Cont) | 2 | 2(Cont) |
| 0 | 0 | 0 | 0 | 0 | 0 |
| 0 | 0 | 0 | 0 | 0 | 0 |
| 0 | 0 | 0 | 0 | 0 | 0 |
| 4 | 8 | 4 | 4 | 4 | 6 |
| 8 | 16 | 8 | 8 | 8 | 12 |
| 12 | 24 | 12 | 12 | 12 | 18 |
| 0 | 0 | 0 | 0 | 0 | 0 |
| 8 | 0 | 8 | 8 | 8 | 12 |
| 16 | 0 | 16 | 16 | 16 | 24 |
| 24 | 0 | 24 | 24 | 24 | 36 |
| 0 | 0 | 0 | 0 | 0 | 0 |
| 12 | 10 | 12 | 12 | 12 | 18 |
| 24 | 20 | 24 | 24 | 24 | 36 |
| 36 | 30 | 36 | 36 | 36 | 54 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 4 | 12 | 4 | 4 | 5 | 7 |
| 8 | 24 | 8 | 8 | 10 | 14 |
| 12 | 36 | 12 | 12 | 15 | 21 |
| 0 | 0 | 0 | 0 | 0 | 0 |
| 8 | 0 | 8 | 8 | 10 | 14 |
| 16 | 0 | 16 | 16 | 20 | 28 |
| 24 | 0 | 24 | 24 | 30 | 42 |
| 0 | 0 | 0 | 0 | 0 | 0 |
| 12 | 14 | 12 | 12 | 15 | 21 |
| 24 | 28 | 24 | 24 | 30 | 42 |
| 36 | 42 | 36 | 36 | 45 | 63 |

The processor 10 is constructed to be capable of being placed in an array of processors or computational modules to accommodate transformations up to 4096 points in length. However, for transforms larger than N=64 (or other preselected values) the value of the twiddle factors $\cos 2\pi k_o/N$ and $\sin 2\pi k_o/N$ must be modified by positional factors. As stated previously, the complex-data output from the 4-point DFT 20 is in the form A + jB. For 4096-point FFT's, this output is multiplied times the complex twiddle factor $W^l_{4096}$ which is also expressed as:

$$W^l_{4096} = \cos 2\pi l/4096 - j \sin 2\pi l/4096$$

These factors are applied to the output value P of the processor 10 ($0 \leq P \leq 63$). Therefore the value of $\cos 2\pi l/4096$ is stored in the synergist RAM at location P and the value of $\sin 2\pi l/4096$ is stored in a location P+1. The product that results from the complex twiddle factor multiplication is:

$$(A+jB)(\cos 2\pi l/4096 - j\sin 2\pi l/4096)$$
$$= A\cos 2\pi l/4096 + B\sin 2\pi l/4096 + j(B\cos 2\pi l/4096 - A\sin 2\pi l/4096)$$

Figure 11:
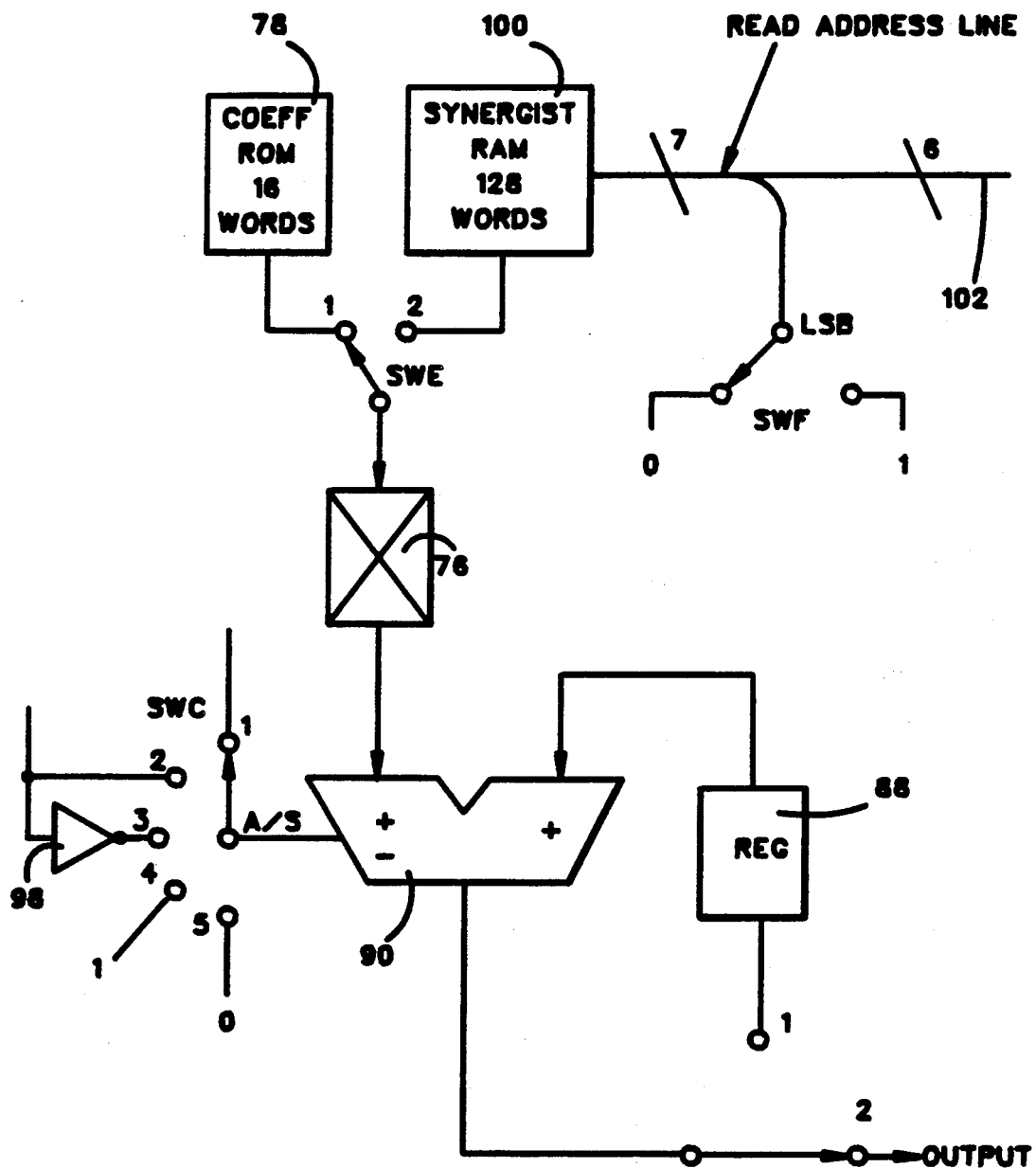
FIG. 11 illustrates a complex multiplier useful in generating the twiddle factors useful for the processor of FIG. 4.

The circuit of FIG. 10 is easily augmented to incorporate this new requirement and accommodate larger transform sizes. In FIG. 11, the coefficient ROM 78 contains the coefficients previously discussed and a synergist RAM 100 now uses 128 16-bit words to store the positionally corrected twiddle factors. These factors are selected by providing addresses on the address bus line 102 to select the terms needed for the above equations. In order to provide a means of selecting the sine or cosine of the twiddle factor angle, selector switch SWF appends an LSB value of either 1 or 0 to bus 102.

The factors from either the ROM 78 or the RAM 100 are selected for use by an electronic switch SWE. The factors are provided through the electronic switch to the multiplier 76. The multiplier product is then transferred to the accumulator 90 where it is added or subtracted, as before, to provide the desired element of the transformation. The data provided through the switch SWC is also expanded by adding two additional switch positions which are fixed at 1 and 0 which provides fixed "add" and "subtract" settings on the A/S input of accumulator 90. The timing relationship of the switches used in FIG. 11 is presented in Table IV.

TABLE IV

| SWB | SWC | SWD | SWE | SWF |
| --- | --- | --- | --- | --- |
| 1 | 5 | 1 | 2 | 0 |
| 2 | 5 | 2 | 2 | 1 |
| 2 | 5 | 1 | 2 | 0 |
| 1 | 4 | 2 | 2 | 1 |

Whenever N>64, the twiddle-factors must be loaded into the synergist RAM for first-tier devices or processing. The twiddle factor is:

$$W_N^{ar_1} = \cos 2\pi ar_1/N - j \sin 2\pi ar_1/N$$

where "a" is the output number from a given FFT device or processor 10 in an array of z such processors and $r_1$ is the processor number or position in the array. For transformations larger than 64-points, the number of processors and building block sizes in the first tier of processing follow the pattern:

| Transform Size | 1st tier modules | Radix Size | Building blocks per processor |
| --- | --- | --- | --- |
| 128 | 2 | 16 | 4 |
| 256 | 4 | 16 | 4 |
| 512 | 8 | 16 | 4 |
| 1024 | 16 | 32 | 2 |
| 2048 | 32 | 32 | 2 |
| 4096 | 64 | 64 | 1 | and similar tables may be constructed for any remaining tiers.

If the processors in the first processing tier are numbered, D=0, 1, 2, . . . , (N/64−1), the range of the values for a and $r_1$ can be expressed as a function of N. If p is defined as being equal to INT $[1.2+0.4 \log_2 N]$ then:

$$R_0 = 2^p, \quad 0 \leq a \leq R_0 - 1 \text{ and}$$

$$\frac{64D}{R_o} \leq r_1 \leq \frac{64D}{R_0} + \left(\frac{64D}{R_o} - 1\right)$$

The twiddle-factor exponent, $k = ar_1$, is based upon an N-point transform, where the relationship is given by the ratio $ar_1/N = k/N$. However, the stored coefficients are generally based on the maximum size 4096-point transform. Accordingly, a new twiddle-factor exponent q is defined as:

$$q/4096 = k/N \text{ therefore } 4096k/N = 4096 \, ar_1/N$$

and $$0 < q < (4096/N)(R_o - 1)(N/R_o - 1) < 2^{12}$$

It is clear that a 12-bit data signal is adequate to represent the value of q. The first 6 bits of q divide a unit circle into 64 sub-arcs and the last 6 bits essentially subdivide each of these arcs into 64 smaller segmented arcs. Therefore, it is also true that:

$$\cos\frac{2\pi q}{4096} = \left(\cos\frac{2\pi k}{64}\cos\frac{2\pi l}{64^2}\right) \mp \left(\sin\frac{2\pi k}{64}\sin\frac{2\pi l}{64^2}\right)$$

and $$\sin\frac{2\pi q}{4096} = \left(\sin\frac{2\pi k}{64}\cos\frac{2\pi l}{64^2}\right) \pm \left(\sin\frac{2\pi l}{64^2}\cos\frac{2\pi k}{64}\right)$$

For any arbitrary twiddle-factor values these equations describe the method for computing the associated synergist RAM values from the basic coefficient values in ROM and the synergist ROM values. Therefore, the previous embodiments can be modified to include a synergist-RAM-input computation as a mechanized function or operation which takes into account the stored coefficients in ROM and processor number or location in an array.

Figure 12:
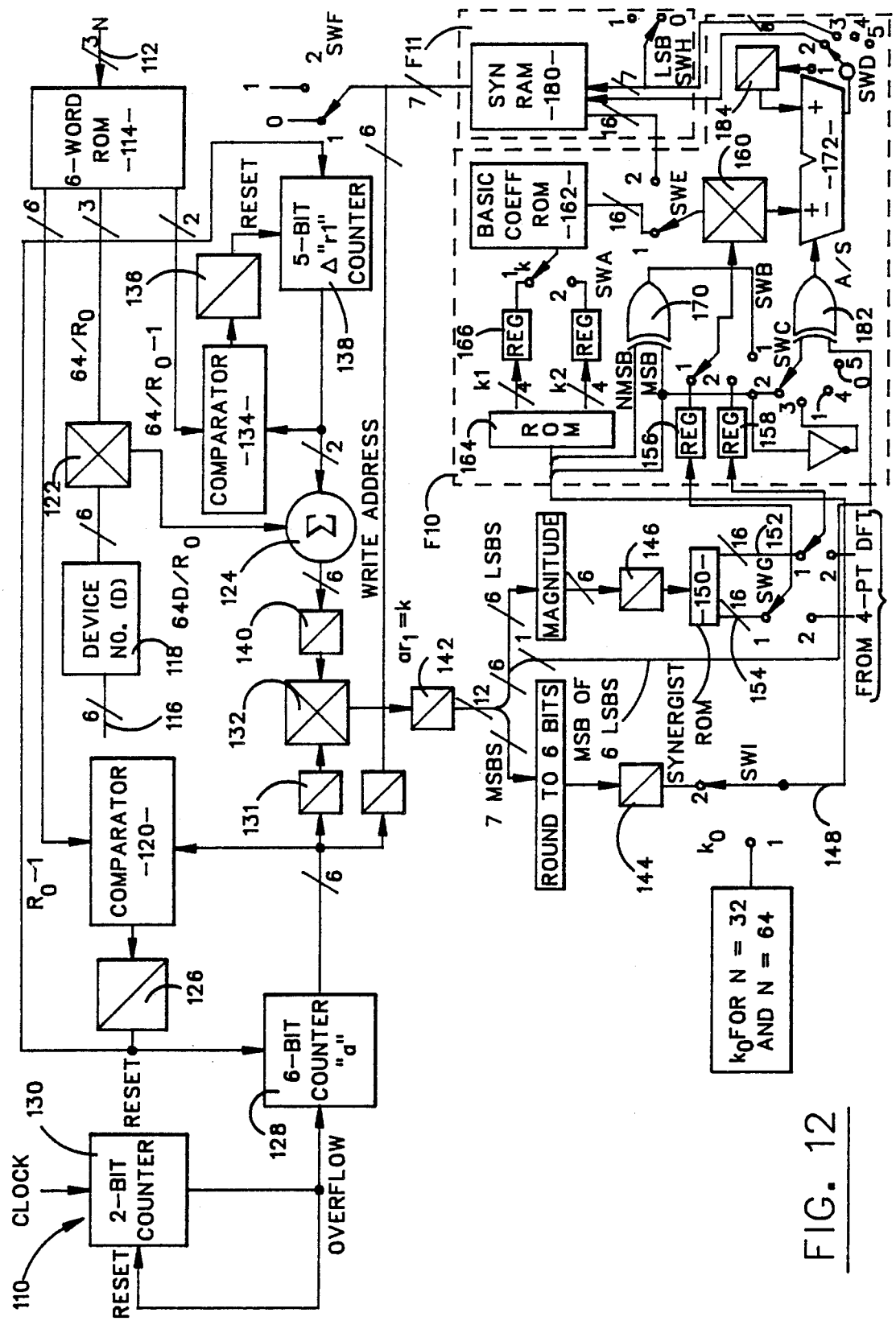
FIG. 12 illustrates a complex multiplier useful in generating the coefficients useful for the processor of FIG. 2.

An apparatus for generating all of the appropriate synergist RAM values is illustrated in more detail in FIG. 12. The functional switching sequence required for generating each pair of inputs to the synergist RAM used in this circuit are listed in Table V below.

In FIG. 12, a complete positionally sensitive coefficient generator 110 is illustrated. The first stage of the generator 110 utilizes logic to determine the relative position of the given FFT module 10 in a group of modules and to set the adjustment values for the coefficients accordingly. An input control signal is applied to a control bus 116 to set the device number using a 6-bit signal. A second input is N, the transform size, which is used as an address for a 6-Word ROM or similar storage device 114. At processor initialization, the transform size to be used is selected by a 3-bit input control signal on a bus 112. The selection using only 3-bit addressing occurs because the number of values for N is limited to six pre-stored values in a memory element 114 which are easily addressed using 3 bits of information. Those skilled in the art will readily understand that these values are chosen for optimization purposes but that additional values of N can be stored and retrieved by adjusting the storage capacity of the memory element 114 and the bit-width of the control bus 112.

The output of the ROM 114 is divided into three output busses. The first comprises a 6-bit wide bus for transferring the value of $R_o-1$ to a comparator 120 where $R_o$ is the radix or building-block size in the first tier of devices (see FIG. 1). The second bus comprises a 3-bit bus for transferring the value of $64/R_o$ to a multiplier 122. This value is the number of building blocks to be mechanized within each processor. The third signal, which is transferred over a 2-bit bus, is the value of $64/R_o-1$. the maximum value for $r_1$. The multiplier 122 provides a value which is the smallest building block number, $64D/R_o$, which is being mechanized by this one processor, which is then applied to a summation device 124. The second input to device 124 is the member number within the set of building blocks which are being mechanized by this processor. The output of the summation device 124 is the number of the building block which is being set up for processing. This computing operation steps through all building blocks.

The output of the comparator 120 is held by a register 126 which is connected to a 6-bit counter 128. The input line of the counter 128 is also connected to a 2-bit counter 130. The output of the 6-bit counter 128 is the value of "a" in the above equations. The value of "a" is multiplied by the value "$r_1$" from the register 140, which is the identification of the building block number being set up. When the input clock signal is transferred from the 2-bit counter 130 to the 6-bit counter 128, the 6-bit counter advances and its contents are also transferred to a register 131 and the comparator 120. When the comparator 120 detects that the counter 128 value has reached a predetermined level, a reset signal is transferred to both the register 126 and the 6-bit counter 128.

At the same time, the value $64/R_o-1$ is transferred into a comparator 134 which has an output connected to a register 136. The output of the register 136 acts as a reset for a 5-bit counter 138 which in turn has an output connected to the comparator 134 where it is compared to the value of $64/R_o-1$. When the value of the 5-bit counter reaches that of the $64/R_o-1$, a reset signal is sent to both the register 136 and the 5-bit counter 138.

The contents of the 5-bit counter 138 are transferred to the summation device 124 where it is combined with the output of multiplier 122, which is the smallest number building block to be set up within this processor, and transferred into a register 140 as "$r_1$". The values of "a" and "$r_1$" are transferred to the multiplier 132 where they are combined to provide the product "$ar_1$", the exponent of the twiddle factor, which is used in the transformation equation illustrated above. The resulting "$ar_1$" product is stored in a register 142 from which it is transferred for subsequent operations.

The value of "$ar_1$" is then transferred as a 12-bit product with the seven most significant bits being sent to a register 144, and the six least significant bits being transferred to a register 146. The seven most significant bits are subjected to a rounding procedure to provide a 6-bit register input, while the six least significant bits are treated as a signed 2's complement number and converted to magnitude with a zero sign bit. The least significant bits describe the value of "l" discussed above. This value for l is applied as an address input to a memory 150 which contains 33 complex words. Therefore, as l varies from 0 to 32, one of 33 complex words are selected for output from the memory element 150.

The memory element 150 represents the previously discussed synergist memory or ROM, and contains 32-bit data words which describe the desired sine and cosine twiddle factors required. For each word output from the memory 150, 16 bits describe a sine function and 16 bits describe a cosine function of the phase angle $2\pi l/4096$. The 16 sine bits are transferred from the memory 150 on a data bus 152 while the 16 cosine bits are transferred on the data bus 154.

The sine and cosine output values are transferred to holding registers 156 and 158, respectively. Each register is alternately accessed through a switch SWB by a multiplier 160 where the sine or cosine value is multiplied times a basic coefficient value from a coefficient ROM 162. The basic coefficient ROM 162 is connected to the multiplier 160 by an electronic bus switch SWE which also allows connection of the synergist RAM 180, as discussed below.

The contents of register 144 are input to the final coefficient processing section through a switch SWI on a data bus 148. It should be noted that the circuit portions surrounded by dashed lines F10 and F11 in FIG.

12 were previously described in relation to FIGS. 10 and 11, respectively. The value of the bits on bus 148 represents $k_o$ which serves as an addressing signal to storage ROM 164. Values $k_1$ and $k_2$ are read from ROM 164 and transferred to two registers 166 and 168, respectively, on 4-bit wide busses. The values of $k_1$ and $k_2$ are used, as before, to select an appropriate twiddle factor from the basic coefficient ROM 162 according to the data quadrant (phase). At the same time, the MSB and NMSB values of the $k_o$ input are transferred to an exclusive OR gate 170. The output of the exclusive OR gate 170 is applied to one pole of a 5-pole or position electronic relay or switch SWC.

The values from the basic coefficient ROM 162 are transferred as 16-bit data words to the multiplier 160 where they are multiplied times the appropriate positional or array values from the synergist ROM 150 which were previously transferred to the registers 156 and 158. The register values are selected by the switch SWB and input one at a time into the multiplier 160. The product of the multiplication is then transferred to an adder/accumulator 172 where they are sign adjusted according to the value of "l".

The most significant bit of the $k_o$ value is transferred as an input to the exclusive OR gate 170 and one pole of a, 5-pole or position switch SWC. An inverter is connected between the MSB pole and a second pole and the remaining two poles are permanently connected to a source of digital "0" and digital "1" levels. The output of the switch SWC is applied to one port, or an input, of a second exclusive OR gate 182. At the same time, the most significant bit from the six least significant bits of the "l" value is transferred to a second input of the exclusive OR gate 182. The output of the exclusive OR gate 182 is provided as an add/subtract control line for the adder/accumulator 172. This control is used to add or subtract the accumulator input values and provides a quadrant or sign adjusted output prior to transferring the product to the synergist RAM 180 for storage.

Once the computed coefficients are transferred and stored in the synergist RAM 180, processing is ready to begin on incoming data. It is important to note the impact of computing and storing coefficients as an internal operation on power-up of the module or device. In an entire array of processors which are interconnected to perform transformations larger than 64-point transformations, each computes and stores the appropriate coefficients during an initialization or power-up phase of operation. This operation occurs in response to the information provided on the busses 112 and 116, which indicate the size of the transformations to be computed and relative processor position within an array. This is a decided advantage of the present processor over those previously available.

The various switch settings that are required for operation of the apparatus of FIG. 12 in order to compute the desired coefficients are listed in Table V below. The designation D/C means "don't care".

TABLE V

| SWA | SWB | SHC | SWD | SWE | SWG | SWF | SWI |
|-----|-----|-----|-----|-----|-----|-----|-----|
| 1   | 1   | 1   | 1   | 1   | D/C | 1   | 2   |
| 2   | 2   | 3   | 2   | 1   | 1   | 1   | 2   |
| 2   | 1   | 2   | 1   | 1   | D/C | 1   | 2   |
| 1   | 2   | 1   | 2   | 1   | 1   | 1   | 2   |

The values for the bits output from the 6-word ROM 114 during generation of the coefficients for the synergist RAM 180, are illustrated in Table VI.

TABLE VI

| N    | $R_0$ | $R_1$ | $64/R_0$ | $64/R_0 - 1$ | D    |
|------|-------|-------|----------|--------------|------|
| 128  | 16    | 8     | 4        | 3            | 0-1  |
| 256  | 16    | 16    | 4        | 3            | 0-3  |
| 512  | 16    | 32    | 4        | 3            | 0-7  |
| 1024 | 32    | 32    | 2        | 1            | 0-15 |
| 2048 | 32    | 64    | 2        | 1            | 0-31 |
| 4096 | 64    | 64    | 1        | 0            | 0-63 |

In order to process incoming data, the switch SWG is changed to accept input from the 4 point DFT element 20 and transfer this data into the two registers 156 and 158 as representative of the values of A and B, respectively, in the previously discussed equations. The output of the 2-bit counter 130 is subjected to a brief delay to assure appropriate timing and arrival of data before operation, and is applied to the synergist RAM 180 as an address call to select the desired twiddle-factor coefficient. The selected twiddle-factor coefficient is transferred to the multiplier 160. The switch SWE is repositioned to receive the synergist RAM output and not the basic coefficient ROM (unless this is a single processor array. D=0). The product from the multiplier 160 is transferred to the adder accumulator circuitry 172 and register 184 where it is accumulated and added to subsequent products as required by the FFT algorithm being implemented.

It is estimated that the above structure could be manufactured very efficiently as two integrated circuit packages, or die, containing about 54.9 to 55.7 thousand transistors each. One integrated circuit could easily accommodate the input portion of the structure comprising the input memories, serial receiver, the DFT adder/accumulator, DFT output circuitry, and the synergist ROM with timing and control logic. Such a circuit would comprise about 55,690 transistors. A second circuit would comprise the output portion of the structure, that is, data and coefficient receivers, multiplier, adder and accumulator, output memory and buffers, output drivers, synergist RAM and coefficient ROM, along with any desired control or self test circuitry. This circuit is estimated to comprise 54,908 transistors. Both of these integrated circuits are based on existing CMOS technology typically manufactured using 2 $\mu$m technology and together comprise a single processor module. However, using smaller or higher resolution elements such as 1 $\mu$m technology, and allowing for changes in yield, the entire module can be placed on a single circuit die.

With minor changes in device programmability, so that each modular processor executes one of the following N-point transform combinations, a large number of performance possibilities can be selected as further listed in Table VII.

TABLE VII

| Number of Transforms | Transform Size |
|---------------------|----------------|
| 1                   | 64             |
| 1 or 2              | 32             |
| 1, 2, or 4          | 16             |
| 1, 2, 4, or 8       | 8              |
| 1, 2, 4, 8, or 16   | 4              |
| 1, 2, 4, 8, 16, or 32 | 2            |

What has been described then is a new method and apparatus for performing variable size transforms at very high speed with low complexity and manufacturing cost. The apparatus of the present invention provides greatly improved processing speed and signal-processing throughput with very low power consumption which meets or exceeds the processing requirements for many advanced signal processing applications. A single device is capable of performing a 64-point FFT in a nominal 19–20 μs in 2.0 μm CMOS structures, and about 15 μs in 1.25 μm CMOS structures, while dissipating under 0.5 watts. The ETTP figure of merit is one to two orders of magnitude better than existing devices. This throughput rate supports an A/D sample rate of 3.4 megasamples per second with an epoch latency of 2. The modular expandability accommodates transforms larger than 64-point using multiple processors while maintaining an epoch latency ranging from 2 to 76 microseconds (4096 points) depending on the number of devices used. It employs a bit-serial low data exchange rate between arrayed devices allowing use of wire-wrap interconnection construction less, so power consumption is a multiple of this number for the number used.

Programmability allows a single device type to be used in an array for transform lengths in powers of 2, up to a maximum of 4096. It is estimated that 11 input ports or pins would be required for array control: 4 pins for the 10 transform size codes, 1 pin to determine 1 of 2 rank positions, and 6 pins to determine 1 of 64 device positions. When combined with input and output data pins, here 64 each, power and associated ground pins, 2 each, and clock and synchronization signal pins, 2 each, a total processor module package uses about 147 to 149 pins in this configuration.

In the preferred embodiment, no windowing functions were implemented since this exacts speed, cost, and power penalties due to the additional circuitry required. However, where desired certain limited weighting functions can be added to the operation of the FFT processor 10.

A major difference between this device and existing devices is the approach to data and computation storage and control. Sufficient memory size is supplied to accommodate all coefficient storage internally within the device 10. No downloaded coefficients are required. By including all data, coefficient, and address sequencing storage on the same chip with the ALU, supporting circuitry is not required and system complexity is minimized. At the same time, no speed or power is lost for external data addressing and control. The preferred embodiment provides about 4096 bits of input data RAM storage. 2048 bits of output data RAM storage, 288 bits of ROM coefficient storage, and 2048 bits of RAM and 1024 bits of ROM storage for synergist coefficients. In addition, all address sequencing is internally generated and stored.

By making each computational block or module "pin" programmable, each module can accommodate a variable number of points and radix operations up to predetermined limits. Utilizing preset or preconfigured control commands or programs, the modules combine to compute highly complex but variable transform analysis. The modules can be reprogrammed in real time or preset for new transform sizes prior to installation in a particular application environment. This results in a very versatile processor.

The foregoing description of preferred embodiments has been presented for purposes of illustration and description. It is not intended to be exhaustive nor to limit the invention to the precise forms disclosed, and many modifications and variations are possible in light of the above teaching. The embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What we claim as our invention is:

1. A modular, arrayable, FFT processor for performing a preselected N-point FFT algorithm, comprising:
   input memory means for receiving and storing data from a plurality of input lines and for storing products and summations;
   Direct Fourier Transformation (DFT) means connected to receive data from said input memory means for selectively performing R-pint direct Fourier transformations on said data according to said FFT algorithm, where R is less than eight;
   arithmetic logic means connected at a first input with an output of said DFT means for performing multiplications and for accumulating complex data and multiplication products for forming positive and negative summations according to said FFT algorithm and having an output connected to said input memory for storage of intermediate products and summations for the FFT algorithm;
   adjusted twiddle factor storage means connected to a second input of said arithmetic logic means for providing phase adjusting twiddle-factor coefficients for implementation of said FFT algorithm, which coefficients are preselected according to a desired size of the Fourier transformation being performed and a relative array position of the arrayable FFT processor in an array of z such processors; and
   output means connected to an output of said arithmetic logic means for transferring results of said FFT algorithm to a plurality of output lines.

2. The FFT processor of claim 1 wherein said DFT is configured to selectively alter R between 2, 3, 4, and 6 depending upon a preselected FFT point size.

3. The FFT processor of claim 1 wherein said DFT is configured to selectively alter R between 2 and 4 depending upon a preselected FFT point size.

4. The FFT processor of claim 1 wherein said DFT is configured to selectively alter R between 3 and 6 depending upon a preselected FFT point size.

5. The FFT processor of claim 1 wherein said adjusted, twiddle-factor storage means comprises:
   basic twiddle-factor coefficient memory containing coefficient values required to compute mixed n power-of-two, m power-of-three, p power-of-four, and q power-of-six FFT's, where $N = 2^n 3^m 4^p 6^q$ and has a predetermined maximum value less than or equal to 64;
   incremental twiddle-factor coefficient memory containing coefficients required to incrementally adjust said basic coefficients through multiplication to generate coefficients necessary to compute all mixed power-of-two, power-of-three, power-of-four, and power-of-six FFTs up to a predetermined maximum-size FFT point value T, where $T \geq N$;

multiplication means connected to receive coefficients from both said basic and incremental twiddle-factor coefficient memories for generating the product thereof; and synergist twiddle-factor storage means for storing said product as synergistic twiddle-factors.

6. The FFT processor of claim 5 wherein T is the product of all $N_z$ where N is the preselected FFT point size for each of z such processors in an array of processors.

7. The processor of claim 5 wherein the processor is configured to perform 1 through 64/N N-point-FFT computations.

8. The FFT processor of claim 5 wherein $p=q=0$ and $N=2^n3^m$.

9. The FFT processor of claim 1 wherein said arithmetic logic means comprises:

multiplication means connected in series with an output of said DFT means for performing multiplications according to said FFT algorithm, and accumulation means connected in series with said multiplication means for accumulating complex data and multiplication products for forming positive and negative summations and according to said FFT algorithm.

10. The FFT processor of claim 9 further comprising selection means disposed in series between outputs of both said DFT and twiddle-factor storage means and an input of said multiplication means for selectively coupling one of said outputs at a time to said multiplication means input.

11. The processor of claim 1 further comprising control means for providing clock signals for said input memory, Direct Fourier Transformation, arithmetic logic, adjusted twiddle-factor storage, and output means so as to synchronize their operations and set data input/output rates for said processor to interface with other apparatus, and for providing control signals which select desired values for N, R, and T.

12. The processor of claim 11 wherein said control signals comprise a series of control bits for setting said DFT means to a selected one of said R-point FFTs and control bits for selecting correct ones of said adjusted twiddle-factors associated with the value of T.

13. The processor of claim 12 wherein said control means further comprises:

parameter storage means for storing a plurality of control bit patterns useful in setting said predetermined values for N, R, and T; and selection means connected to said parameter storage means having programmable input pins capable of being electrically interconnected to select desired ones of said control bit patterns.

14. The processor of claim 12 wherein at least one of said control bit patterns comprises an initialization control pattern which activates said basic and incremental twiddle-factor selection and generation of products thereof at an initialization stage for said processor.

15. The processor of claim 1 wherein said input and output means are configured to transfer input data and output data in a complex 32-bit 2's-complement format comprising 16 real and 16 imaginary bits.

16. The processor of claim 1 wherein said input memory means comprises an M-word ping-pong input buffer and scratchpad memory.

17. The processor of claim 1 wherein said plurality of input and output lines comprise 64 signal-input lines and 64 signal-output lines.

18. The processor of claim 1 further comprising input formatting means connected in series with said plurality of signal-input lines for converting input data into a predetermined parallel format.

19. The processor of claim 1 further comprising an output formatting means connected in series with said plurality of signal-output lines for converting output data from parallel format to a predetermined serial format.

20. The processor of claim 1 further comprising scaling means connected in series with said arithmetic logic means for selectively applying block floating point, divide-by-two and divide-by-four scaling.

21. A programmable, arrayable, signal-processing device useful for computing N-point FFT algorithms in an array of z such devices, with 64 signal-input lines and 64 signal output lines, comprising:

an input formatting register connected in series with said signal-input lines being configured for converting received data into a predetermined parallel format;

a 64-word plus 64-word ping-pong type input memory connected in series with said input formatting register;

Direct Fourier Transformation means connected to receive data from said input memory means for performing 2-point direct Fourier transformations on said data according to said FFT algorithm;

a 16-bit by 16 2's-bit complement, fully parallel modified Booth multiplier with true rounding connected to receive data from said Direct Fourier Transformation means;

a basic 64-point transform twiddle-factor coefficient memory containing coefficient values necessary to compute all power-of-two FFT's from an 8-point FFT up to a 64-point FFT;

an incremental-twiddle-factor coefficient memory containing coefficients required to incrementally adjust said basic coefficients through multiplication to generate synergist-twiddle-factor coefficients which are necessary to compute all mixed power-of-two FFT up to a maximum T-point size, where $T \leq 4096$;

transfer means connected to outputs for both said basic and incremental coefficient memories and an input of said multiplier for transferring coefficients to said multiplier;

a complex accumulator connected in series with said multiplier and having an output connected to one of said ping-pong memories for transferring FFT-butterfly computations thereto;

a 64-word plus 64-word ping-pong type output memory connected to receive data from said accumulator;

an output formatting register configured to selectively format parallel format output data to predetermined serial or parallel formats; and control means connected to each of said input formatting register, input memory, multiplier, basic twiddle-factor storage, adjusted twiddle-factor storage, complex accumulator, transfer means, output memory and output formatting register for providing clock signals thereto for synchronizing their operations and controlling data input/output rates for said processor to interface with other apparatus, and for providing control signals which select desired values for N.

22. The device of claim 21 wherein said multiplier and said accumulator are selectively connected to said input buffer/ping-pong memory and said DFT means so as to perform mixed radix-2 and computations in executing said N-point FFT computation.

23. The device of claim 21 wherein said multiplier and said accumulator are selectively connected to said input buffer/ping-pong memory and said DFT means so as to perform all integral sub-multiples of mixed power-of-two and FFT computations in executing said N-size FFT computation.

24. The device of claim 21 wherein said multiplier and said accumulator are selectively connected to said input buffer/ping-pong memory and said DFT means so as to perform 1 through 32 2-point-FFT computations.

25. The processor of claim 21 wherein said control means further comprises:
parameter storage means for storing a plurality of control bits useful in setting predetermined values for N, and T; and
selection means connected to said parameter storage means having programmable input pins capable of being electrically interconnected to select desired ones of said control bits.

26. The processor of claim 25 wherein at least one of said control bit patterns comprises an initialization control pattern which activates said basic and incremental twiddle-factor selection and generation of products thereof at an initialization stage for said processor.

27. The device of claim 21 further comprising selection means disposed in series between an output of both said input and twiddle-factor coefficient memories and an input of said multiplier for selectively coupling one of said outputs at a time to said multiplication means input.

28. The device of claim 21 further comprising scaling means connected in series with said accumulator for selectively applying block floating point, divide-by-two and divide-by-four scaling.

29. The device of claim 21 wherein said input and output memories and formatting means are configured to transfer input data and output data in a complex 32-bit 2's-complement format comprising 16 and 16 imaginary bits.

30. A method of performing a preselected N-point FFT algorithm in an array of z FFT modules performing a T-point FFT, comprising the steps of:
receiving and storing data from a plurality of input lines;
providing basic twiddle factors for performing mixed power-of-two and power-of-three FFTs up to a maximum value N;
adjusting said basic twiddle factors for implementation of all mixed power-of-two and power-of-three FFTs up to a maximum value T using adjusting coefficients;
performing preselected R-point direct Fourier transformations on said received data according to said FFT algorithm, where R less then eight;
performing multiplications on the results of said direct transformations according to said FFT algorithm in a multiplier;
accumulating complex data and multiplication products for forming positive and negative summations according to said FFT algorithm in an accumulator;
storing and retrieving intermediate butterfly results for the FFT algorithms; and
transferring results of said FFT algorithm to a plurality of output lines.

31. The method of claim 30 wherein the step of adjusting comprises the step of providing incremental-twiddle-factor coefficients to incrementally adjust said basic coefficients through multiplication to generate synergistic-twiddle-factor coefficients necessary to compute all mixed power-of-two and power-of-three FFTs up to a maximum T-point size, with $T \leq 4096$.

32. The method of claim 30 wherein $N \leq 64$.

33. The method of claim 30 further comprising the step of selectively connecting the multiplier and accumulator to an input buffer/ping-pong memory which receives the data so as to perform all integral sub-multiples of mixed power-of-two and power-of-three FFT computations in performing said N-point FFT computation.

34. The method of claim 33 further comprising configuring said multiplier and said accumulator to perform mixed radix-2, radix-3, radix-4, and radix-6 computations in executing said integral sub-multiples of mixed power-of-two and power-of-three FFT computations.

35. The method of claim 34 further comprising the steps of:
performing said power-of-two computations in sequence on orthogonal complex-coordinate-system data;
performing internal coordinate-system transformation to a $(1, W_3)$ coordinate system; and
performing said power-of-three and power-of-six computations in sequence on data which is in the $(1, W_3)$ coordinate system.

36. The method of claim 35 comprising the step of converting the output from the $(1, W_3)$ coordinate system back to said orthogonal coordinate system.

37. The method of claim 34 further comprising the steps of:
performing said power-of-three and power-of-six computations in sequence on data which is in a $(1, W_3)$ coordinate system;
performing internal coordinate-system transformation of these results to the orthogonal coordinate system; and
performing said power-of-two and power-of-four computations in sequence on the orthogonal complex-coordinate-system data.

38. The method of claim 37 further comprising the step of converting input data from an orthogonal coordinate system, to an internal $(1, W_3)$ coordinate system prior to performing said FFT computations.

39. The method of claim 30 where the step of providing twiddle factor coefficients further comprises the steps of:
providing basic twiddle-factor coefficient values required to compute mixed power-of-four and power-of-six FFT's;
providing incremental twiddle-factor coefficients required to incrementally adjust said basic coefficients to generate those coefficient necessary to compute all mixed power-of-two, power-of-three, power-of-four, and power-of-six FFTs up to a predetermined maximum-size FFT point value T, where $T \geq N$.

40. The apparatus of claim 37 wherein T is less than or equal to four thousand and ninety-six.

* * * * *